(12) United States Patent
Nomura et al.

(10) Patent No.: US 11,702,368 B2
(45) Date of Patent: Jul. 18, 2023

(54) DIELECTRIC CERAMIC COMPOSITION AND CERAMIC ELECTRONIC COMPONENT

(71) Applicant: SHOEI CHEMICAL INC., Tokyo (JP)

(72) Inventors: Takeshi Nomura, Tosu (JP); Yukari Sasaki, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 504 days.

(21) Appl. No.: 17/046,691

(22) PCT Filed: Mar. 15, 2019

(86) PCT No.: PCT/JP2019/010830
§ 371 (c)(1),
(2) Date: Oct. 9, 2020

(87) PCT Pub. No.: WO2019/198418
PCT Pub. Date: Oct. 17, 2019

(65) Prior Publication Data
US 2021/0155549 A1 May 27, 2021

(30) Foreign Application Priority Data
Apr. 11, 2018 (JP) ................................ 2018-076092

(51) Int. Cl.
*C04B 35/495* (2006.01)
*H01G 4/008* (2006.01)
(Continued)

(52) U.S. Cl.
CPC ........... *C04B 35/495* (2013.01); *H01G 4/008* (2013.01); *H01G 4/1254* (2013.01); *H01G 4/30* (2013.01);
(Continued)

(58) Field of Classification Search
CPC ........ H01G 4/30; H01G 4/008; H01G 4/1254; C04B 35/495; C04B 2235/3232;
(Continued)

(56) References Cited

U.S. PATENT DOCUMENTS

2011/0254642 A1* 10/2011 Enokida ................... H01B 3/12
333/219.1
2017/0280559 A1* 9/2017 Nakajima .......... C04B 35/63416
2018/0040424 A1* 2/2018 Takahashi ............... C04B 35/64

FOREIGN PATENT DOCUMENTS

CN 1793004 A 6/2006
CN 103288452 A 9/2013
(Continued)

OTHER PUBLICATIONS

European Patent Office, Extended European Search Report Issued in Application No. 19784351.9, dated Mar. 25, 2022, Germany, 8 pages.
(Continued)

*Primary Examiner* — Arun Ramaswamy
(74) *Attorney, Agent, or Firm* — Alleman Hall Creasman & Tuttle LLP

(57) ABSTRACT

A dielectric ceramic composition including a first component and a second component. The first component comprises an oxide of Ca of 0.00 mol % to 35.85 mol % an oxide of Sr of 0.00 mol % to 47.12 mol %, an oxide of Ba of 0.00 mol % to 51.22 mol %, an oxide of Ti of 0.00 mol % to 17.36 mol %, an oxide of Zr of 0.00 mol % to 17.36 mol %, an oxide of Sn of 0.00 mol % to 2.60 mol %, an oxide of Nb of 0.00 mol % to 35.32 mol %, an oxide of Ta of 0.00 mol % to 35.32 mol %, and an oxide of V of 0.00 mol % to 2.65 mol %. The second component includes (by mass) at least (a) an oxide of Mn of 0.005% to 3.500% and (b) one or both of an oxide of Cu of 0.080% to 20.000% and an oxide of Ru of 0.300% to 45.000%.

16 Claims, 4 Drawing Sheets

(51) Int. Cl.
    *H01G 4/12*    (2006.01)
    *H01G 4/30*    (2006.01)

(52) U.S. Cl.
    CPC ........... *C04B 2235/3232* (2013.01); *C04B 2235/3236* (2013.01); *C04B 2235/3239* (2013.01); *C04B 2235/3244* (2013.01); *C04B 2235/3251* (2013.01); *C04B 2235/3284* (2013.01); *C04B 2235/442* (2013.01)

(58) Field of Classification Search
    CPC .... C04B 2235/3236; C04B 2235/3239; C04B 2235/3244; C04B 2235/3251; C04B 2235/3284; C04B 2235/442
    USPC ..... 361/301.4, 311, 312, 321.1, 321.4, 321.5
    See application file for complete search history.

(56) References Cited

FOREIGN PATENT DOCUMENTS

| | | |
|---|---|---|
| JP | H03274607 A | 12/1991 |
| JP | 11043370 A | 2/1999 |
| JP | 2000169215 A | 6/2000 |
| JP | 2002211975 A | 7/2002 |
| JP | 2007197277 A | 8/2007 |
| JP | 2008189487 A | 8/2008 |
| JP | 2012169635 A | 9/2012 |
| JP | 2013180906 A | 9/2013 |
| JP | 2013180907 A | 9/2013 |
| JP | 2013180908 A | 9/2013 |
| KR | 100808472 B1 | 3/2008 |
| WO | 2006114914 A1 | 11/2006 |
| WO | 2008102608 A1 | 8/2008 |
| WO | 2017163842 A1 | 9/2017 |
| WO | 2017163845 A1 | 9/2017 |

OTHER PUBLICATIONS

China National Intellectual Property Administration, Office Action and Search Report Issued in Application No. 201980025034.7, dated Mar. 23, 2022, 15 pages.

* cited by examiner

DIELECTRIC CERAMIC COMPOSITION AND CERAMIC ELECTRONIC COMPONENT

TECHNICAL FIELD

The present invention relates to a dielectric ceramic composition and ceramic electronic components using the dielectric ceramic composition as a dielectric layer.

BACKGROUND ART

In recent years, requirements of electronic components that are operated under a high temperature environment exceeding 150° C. have increased year by year for devices mounted in a harsh temperature environment such as an environment around an engine room of an automobile. In particular, in the automobile market in recent years, use of electronic control for each function has rapidly progressed, aimed at improving safety and environmental performance. Consequently, the mounting ratio of electronic devices has been increased. Of these electronic devices, an electronic device mounted in an engine room is exposed to a harsh temperature environment and thus high heat resistance in addition to high reliability has been required for the electronic components.

Conventionally, ceramic electronic components satisfy such requirements for capacitors and a ceramic composition exhibiting a paraelectricity (paraelectric material) such as calcium zirconate is used for a dielectric layer of the ceramic electronic components. However, the electronic components having a dielectric layer constituted by the paraelectric material have low relative dielectric constant of the ceramic composition and thus capacitors having high capacity cannot be obtained.

Barium titanate ($BaTiO_3$) known as a representative ceramic composition for ceramic capacitors has a high relative dielectric constant. However, barium titanate has the peak of the relative dielectric constant at a characteristic temperature referred to as a ferroelectric transition temperature, and the properties are rapidly lowered at 120° C. or more.

Therefore, the development of a dielectric ceramic composition having a high relative dielectric constant even in a high temperature environment (for example, 150° C. or more) has been desired.

In recent years, in ceramic electronic components, a base metal such as nickel or copper is frequently used as a material for internal electrodes. In the case where the base metal is used as the internal electrode layer, the dielectric layer and the internal electrodes are co-fired. In order to prevent the base metal from oxidation during firing, the ceramic electronic components including the ceramic composition constituting the dielectric layer are fired under a reducing atmosphere.

Non-Patent Literature 1 has described a dielectric ceramic composition having a tungsten bronze structure represented by a general formula $M^{2+}_6M^{4+}_2Nb_8O_{30}$. In this Non-Patent Literature 1, in order to obtain experimental samples, the raw materials of the ceramic composition are mixed, and thereafter the materials are fired around 1,000° C. for 15 hours. The obtained product is ground, dried, and molded, and thereafter further sintered at 1,250° C. to 1,350° C. for 5 hours to 6 hours.

In Patent Literatures 1 to 11, the dielectric ceramic compositions having various tungsten bronze structures have been studied.

CITATION LIST

Non-Patent Literature

Non-Patent Literature 1: Mat. Res. Bull., Vol. 27 (1992), pp. 677-684; R. R. Neurgaonkar, J. G. Nelson and J. R. Oliver

Patent Literatures

Patent Literature 1: Japanese Patent Application Laid-open No. 2002-211975
Patent Literature 2: Japanese Patent Application Laid-open No. 2007-197277
Patent Literature 3: Japanese Patent Application Laid-open No. H11-043370
Patent Literature 4: Japanese Patent Application Laid-open No. 2000-169215
Patent Literature 5: Japanese Patent Application Laid-open No. 2008-189487
Patent Literature 6: WO 08/102608 Pamphlet
Patent Literature 7: WO 06/114914 Pamphlet
Patent Literature 8: Japanese Patent Application Laid-open No. 2013-180906
Patent Literature 9: Japanese Patent Application Laid-open No. 2013-180907
Patent Literature 10: Japanese Patent Application Laid-open No. 2013-180908
Patent Literature 11: Japanese Patent Application Laid-open No. 2012-169635

SUMMARY

Technical Problem

However, in Non-Patent Literature 1, although the properties of the dielectric ceramic composition itself having the tungsten bronze structure have been studied from the academic viewpoint, the applications of the dielectric ceramic composition are not considered at all. In other words, in Non-Patent Literature 1, the dielectric ceramic composition is fired in a laboratory under a normal environmental atmosphere. However, as a result of detailed study for the dielectric ceramic composition having the tungsten bronze structure represented by the general formula conducted by the inventors of the present invention, the inventors of the present invention have found that a dielectric ceramic composition having completely different properties from those of the dielectric ceramic composition reported in Non-Patent Literature 1 is obtained in the case where firing and sintering are performed together with a specific additive component under a reducing atmosphere that has been required for dielectric ceramic compositions in recent years.

In Patent Literatures 1 to 11, the dielectric ceramic compositions having the tungsten bronze structures have also been studied. However, in any of these Patent Literatures, dielectric ceramic compositions simultaneously exhibiting the effects of "being possible to be fired under a reducing atmosphere", "providing sufficiently a high relative dielectric constant", "having an excellent dielectric property in a wide temperature region", and "having a small dielectric loss" have not been obtained.

In addition, in the dielectric ceramic composition required to have high heat resistance as described above, dielectric ceramic compositions further exhibiting a high insulation resistance value under a high temperature environment are desired in addition to the above performances.

Therefore, an object of the present invention is to provide a dielectric ceramic composition that can be fired under a reducing atmosphere, has a high relative dielectric constant, and has a small change in electrostatic capacity even under a high temperature environment, for example, under a condition of 150° C. to 200° C., small dielectric losses at 25° C. and 200° C., and a high insulation resistance value under a high temperature environment in the case where the dielectric ceramic composition is used as the dielectric layer of ceramic electronic components such as a laminated ceramic capacitor, and ceramic electronic components in which the dielectric ceramic composition is used as the dielectric layer.

Solution to Problem

The above-described problems are solved by the present invention described below.

Namely, the present invention (1) provides a dielectric ceramic composition comprising: a first component; and a second component, wherein as a content ratio relative to a total number of moles of the first component when converted into following oxides, the first component comprises an oxide of Ca of 0.00 mol % to 35.85 mol % in terms of CaO, an oxide of Sr of 0.00 mol % to 47.12 mol % in terms of SrO, an oxide of Ba of 0.00 mol % to 51.22 mol % in terms of BaO, an oxide of Ti of 0.00 mol % to 17.36 mol % in terms of $TiO_2$, an oxide of Zr of 0.00 mol % to 17.36 mol % in terms of $ZrO_2$, an oxide of Sn of 0.00 mol % to 2.60 mol % in terms of $SnO_2$, an oxide of Nb of 0.00 mol % to 35.32 mol % in terms of $Nb_2O_5$, an oxide of Ta of 0.00 mol % to 35.32 mol % in terms of $Ta_2O_5$, and an oxide of V of 0.00 mol % to 2.65 mol % in terms of $V_2O_5$;

the first component comprises at least one oxide selected from the oxide of Ca, the oxide of Sr, and the oxide of Ba, at least one oxide selected from the oxide of Ti and the oxide of Zr, and at least one oxide selected from the oxide of Nb and the oxide of Ta as essential components, and, a total content ratio of the oxide of Ca in terms of CaO, the oxide of Sr in terms of SrO, and the oxide of Ba in terms of BaO is 48.72 mol % to 51.22 mol %, a total content ratio of the oxide of Ti in terms of $TiO_2$, the oxide of Zr in terms of $ZrO_2$, and the oxide of Sn in terms of $SnO_2$ is 15.97 mol % to 17.36 mol %, and a total content ratio of the oxide of Nb in terms of $Nb_2O_5$, the oxide of Ta in terms of $Ta_2O_5$, and the oxide of V in terms of $V_2O_5$ is 31.42 mol % to 35.31 mol % relative to the total number of moles of the first component when converted into the oxides; and as a content ratio relative to a total mass of the first component when converted into the oxides, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

In addition, the present invention (2) provides a dielectric ceramic composition comprising: a first component; and a second component, wherein as the first component, a compound represented by a following general formula (1):

$$A_a M^1_b M^2_c O_d \qquad (1)$$

(in the formula (1), A is represented by a general formula (2):

(2)

(in the formula (2), 0≤x≤0.920 and 0≤y≤0.700); $M^1$ is at least one element selected from Ti, Zr, and Sn; $M^2$ is at least one element selected from Nb, Ta, and V; and 5.70≤a≤6.30, 1.90≤b≤2.10, 7.20≤c≤8.80, and 27.45≤d≤32.50) is included (with the proviso that, when Sn is included, a content ratio of the oxide of Sn in terms of $SnO_2$ relative to a total number of moles of the oxide of Ti in terms of $TiO_2$, the oxide of Zr in terms of $ZrO_2$, and the oxide of Sn in terms of $SnO_2$ is 15.00 mol % or less and when V is included, a content ratio of the oxide of V in terms of $V_2O_5$ relative to a total number of moles of the oxide of Nb in terms of $Nb_2O_5$, the oxide of Ta in terms of $Ta_2O_5$, and the oxide of V in terms of $V_2O_5$ is 7.50 mol % or less); and as a content ratio relative to a total mass of the first component when the first component is converted into CaO, SrO, BaO, $TiO_2$, $ZrO_2$, $SnO_2$, $Nb_2O_5$, $Ta_2O_5$, and $V_2O_5$, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

In addition, the present invention (3) provides a dielectric ceramic composition comprising: a first component; and a second component, wherein a compound represented by a following general formula (3):

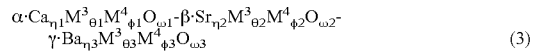

(3)

(in the formula (3), η1, η2, and η3 each independently are values within a range of 5.70 to 6.30; θ1, θ2, and θ3 each independently are values within a range of 0.95 to 1.05; φ1, φ2, and φ3 each independently are values within a range of 0.90 to 1.10; ω1, ω2, and ω3 each independently are values within a range of 27.45 to 32.50; $M^3$ is represented by a general formula (4):

(4)

(in the formula (4), 0≤ρ≤2.0 and 0≤σ≤0.3); $M^4$ is represented by a general formula (5):

(5)

(in the formula (5), 0≤π≤8.0 and 0≤ψ≤0.6); and α, β, and γ satisfy α+β+γ=1.00), and when an arbitrary point in a ternary composition diagram is represented as (α, β, γ), the compound existing within a range surrounded by line segments linking a point A=(0.05, 0.95, 0.00), a point B=(0.70, 0.30, 0.00), a point C=(0.70, 0.00, 0.30), a point D=(0.00, 0.00, 1.00), and a point E=(0.00, 0.90, 0.10) is included as the first component, and as a content ratio relative to a total mass of the first component when the first component is converted into CaO, SrO, BaO, $TiO_2$, $ZrO_2$, $SnO_2$, $Nb_2O_5$, $Ta_2O_5$, and $V_2O_5$, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

In addition, the present invention (4) provides the dielectric ceramic composition of (3), wherein the first component is a compound existing within a range surrounded by line segments linking a point A'=(0.05, 0.95, 0.00), a point B'=(0.60, 0.40, 0.00), a point C'=(0.70, 0.20, 0.10), a point D'=(0.70, 0.10, 0.20), a point E'=(0.55, 0.00, 0.45), a point F'=(0.40, 0.00, 0.60), a point G'=(0.10, 0.10, 0.80), a point H'=(0.00, 0.00, 1.00), a point I'=(0.00, 0.40, 0.60) a point J'=(0.20, 0.40, 0.40), a point K'=(0.00, 0.70, 0.30), and a point L'=(0.00, 0.90, 0.10) in the ternary composition diagram.

In addition, the present invention (5) provides the dielectric ceramic composition of any one of (1) to (4), wherein an oxide of D (D is at least one element selected from Li, Mg, Si, Cr, Al, Fe, Co, Ni, Zn, Ga, Ge, In, W, Mo, Y, Hf, La, Ce, Pr, Nd, Sm, Eu, Gd, Tb, Dy, Ho, Er, Tm, Yb, and Lu) is included as the second component.

In addition, the present invention (6) provides the dielectric ceramic composition of any one of (1) to (5), wherein the dielectric ceramic composition comprises a tungsten bronze type crystal phase.

In addition, the present invention (7) provides the dielectric ceramic composition of any one of (1) to (6), wherein the relative dielectric constant at 25° C. is 100.0 or more.

In addition, the present invention (8) provides the dielectric ceramic composition of (7), wherein the relative dielectric constant at 25° C. is 200.0 or more.

In addition, the present invention (9) provides the dielectric ceramic composition of (8), wherein the relative dielectric constant at 25° C. is 300.0 or more.

In addition, the present invention (10) provides the dielectric ceramic composition of any one of (1) to (9), wherein a change rate of the electrostatic capacity is within a range of −50.0% to 50.0% in a temperature range of −55° C. to 200° C.

In addition, the present invention (11) provides the dielectric ceramic composition of any one of (1) to (10), wherein a change rate of the electrostatic capacity is within a range of −33.0% to 22.0% in a temperature range of −55° C. to 200° C.

In addition, the present invention (12) provides the dielectric ceramic composition of any one of (1) to (11), wherein a dielectric loss (tan δ) at 25° C. is 10.0% or less and a dielectric loss (tan δ) at 200° C. is 10.0% or less.

In addition, the present invention (13) provides the dielectric ceramic composition of any one of (1) to (12), wherein an insulation resistance value at 200° C. is 100 MΩ or more.

In addition, the present invention (14) provides ceramic electronic components, wherein a dielectric layer formed of the dielectric ceramic composition as described in any one of (1) to (13); and an electrode layer comprising a base metal as a conductive component.

In addition, the present invention (15) provides the ceramic electronic components of (14), wherein the base metal is at least one metal selected from nickel and copper.

In addition, the present invention (16) provides the ceramic electronic components of (14) or (15), wherein a plurality of the dielectric layers and a plurality of the electrode layers are laminated.

Advantageous Effects of Invention

According to the present invention, the dielectric ceramic composition that can be fired under a reducing atmosphere has a high relative dielectric constant, and has a small change in electrostatic capacity even under a high temperature condition of 150° C. to 200° C., a change rate of the electrostatic capacity within a range of −50.0% to 50.0% (hereinafter, may be described as within ±50.0%) in a temperature range of −55° C. to 200° C., small dielectric losses at 25° C. and 200° C., and a high insulation resistance value under a high temperature environment in the case where the dielectric ceramic composition is used as the dielectric layer of ceramic electronic components such as a laminated ceramic capacitor, and the ceramic electronic components in which the dielectric ceramic composition is used as the dielectric layer can be provided.

DESCRIPTION OF EMBODIMENTS

Hereinafter, the present invention will be described with reference to embodiments illustrated in drawings. In the present invention, in the description of a numerical range "Δ to □", the values of Δ and □ are included unless otherwise noted.

(Ceramic Capacitor 1)

Figure 8:
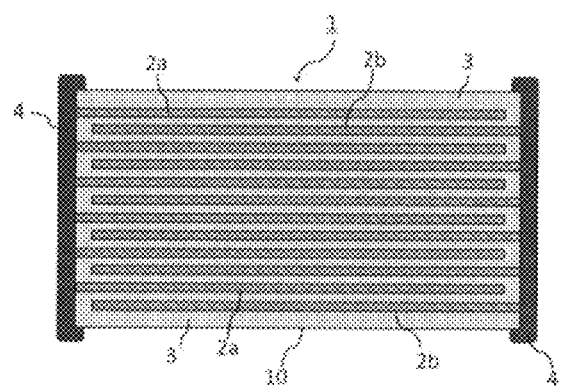
FIG. 8 is a sectional view schematically illustrating a ceramic capacitor.

The ceramic capacitor 1 illustrated in FIG. 8 includes a laminated body 10 having a cuboid shape as a whole. The laminated body 10 is constituted with a plurality of laminated dielectric layers 3 and a plurality of internal electrodes 2a and 2b formed along different interfaces of the dielectric layers 3. The internal electrodes 2a and 2b are alternately arranged in the laminated body 10. Each of the internal electrodes 2a and 2b is electrically connected to an external electrode 4 at different edges of the laminated body 10. On the external electrode 4, a first plated layer made of copper or a nickel-copper alloy, or the like may be formed and a second plated layer made of solder or tin, or the like may be further formed on the first plated layer, if necessary.

As described above, the internal electrodes 2a and 2b are formed in a state where the internal electrodes overlap with each other in a laminated direction of the laminated body 10 and thus accumulate electrical charge between the adjacent internal electrodes 2a and 2b. The electrical connection of the internal electrodes 2a and 2b and the external electrode 4 allows the charge to be taken out.

(Internal Electrodes 2a and 2b)

In the present invention, the base metal is used as a conductive component for the internal electrodes 2a and 2b. As the base metal is used as the conductive component, pure metals such as nickel, copper, and aluminum and, in addition to these metals, alloys, mixtures, or composites including these metal components may be used. As the base metal is used as the conductive component, one metal selected from nickel and copper is particularly preferable. The internal electrodes 2a and 2b may include a conductive component in addition to the base metal and an inhibitor described below as long as the effects of the present invention are not impaired.

The internal electrodes 2a and 2b may be formed by any methods. Examples of the method include a method for forming the internal electrodes using a conductive paste obtained by kneading a metal powder including the base metal with a binder component. In the case where the conductive paste is used, a method for forming the internal electrodes by a printing method such as screen printing is particularly preferable as the method for forming the internal electrodes 2a and 2b. In the conductive paste, as what is called inhibitor for controlling sintering of the metal powder, a dielectric ceramic composition powder having the same components as the components in the dielectric ceramic composition according to the present invention described below may be included. In addition to the above method, the internal electrodes 2a and 2b may also be formed by known methods such as an ink-jet method, a vapor deposition method, and a plating method.

(Dielectric Layer 3)

The dielectric layer 3 is constituted of the dielectric ceramic composition according to the present invention described below, whereby the change in the electrostatic capacity is small even in a wide temperature region, in particular, in a high temperature region of around 200° C., the change rate of the electrostatic capacity is within ±50.0% in a temperature range of −55° C. to 200° C., and both dielectric losses (tan δ) at 25° C. and 200° C. are 10.0% or less, while a high relative dielectric constant is being maintained. In addition, the dielectric ceramic composition according to the present invention has excellent reduction resistance and thus is less likely to be reduced and does not transform to a semiconductor even in the case where the base metal is used as the conductive component of the internal electrode and co-firing is performed under a reducing atmosphere.

(Dielectric Ceramic Composition)

The dielectric ceramic composition according to the first embodiment of the present invention includes the first component and the second component, wherein as a content ratio relative to a total number of moles of the first component when converted into following oxides, the first component comprises an oxide of Ca of 0.00 mol % to 35.85 mol % in terms of CaO, an oxide of Sr of 0.00 mol % to 47.12 mol % in terms of SrO, an oxide of Ba of 0.00 mol % to 51.22 mol % in terms of BaO, an oxide of Ti of 0.00 mol % to 17.36 mol % in terms of $TiO_2$, an oxide of Zr of 0.00 mol % to 17.36 mol % in terms of $ZrO_2$, an oxide of Sn of 0.00 mol % to 2.60 mol % in terms of $SnO_2$, an oxide of Nb of 0.00 mol % to 35.32 mol % in terms of $Nb_2O_5$, an oxide of Ta of 0.00 mol % to 35.32 mol % in terms of $Ta_2O_5$, and an oxide of V of 0.00 mol % to 2.65 mol % in terms of $V_2O_5$;

the first component comprises at least one oxide selected from the oxide of Ca, the oxide of Sr, and the oxide of Ba, at least one oxide selected from the oxide of Ti and the oxide of Zr, and at least one oxide selected from the oxide of Nb and the oxide of Ta as essential components, and a total content ratio of the oxide of Ca in terms of CaO, the oxide of Sr in terms of SrO, and the oxide of Ba in terms of BaO is 48.72 mol % to 51.22 mol %, a total content ratio of the oxide of Ti in terms of $TiO_2$, the oxide of Zr in terms of $ZrO_2$, and the oxide of Sn in terms of $SnO_2$ is 15.97 mol % to 17.36 mol %, and a total content ratio of the oxide of Nb in terms of $Nb_2O_5$, the oxide of Ta in terms of $Ta_2O_5$, and the oxide of V in terms of $V_2O_5$ is 31.42 mol % to 35.31 mol % relative to the total number of moles of the first component when converted into the oxides; and as a content ratio relative to a total mass of the first component when converted into the oxides, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

The dielectric ceramic composition according to the first embodiment of the present invention includes the first component and the second component. In the dielectric ceramic composition according to the first embodiment of the present invention, among oxides included in the dielectric ceramic composition, all oxides other than the oxides included as the first component are included as the second component.

The first component of the dielectric ceramic composition according to the first embodiment of the present invention comprises one or more oxides selected from the oxide of Ca, the oxide of Sr, and the oxide of Ba, one or more oxides selected from the oxide of Ti and the oxide of Zr, and one or more oxides selected from the oxide of Nb and the oxide of Ta as essential components and one or more oxides selected from the oxide of Sn and the oxide of V as optional components.

In the dielectric ceramic composition according to the first embodiment of the present invention, as a content ratio relative to a total number of moles of the first component when converted into the following oxides, the content of each of the oxides existing in the first component is an oxide of Ca of 0.00 mol % to 35.85 mol % in terms of CaO, an oxide of Sr of 0.00 mol % to 47.12 mol % in terms of SrO, an oxide of Ba of 0.00 mol % to 51.22 mol % in terms of BaO, an oxide of Ti of 0.00 mol % to 17.36 mol % in terms of $TiO_2$, an oxide of Zr of 0.00 mol % to 17.36 mol % in terms of $ZrO_2$, an oxide of Sn of 0.00 mol % to 2.60 mol % in terms of $SnO_2$, an oxide of Nb of 0.00 mol % to 35.32 mol % in terms of $Nb_2O_5$, an oxide of Ta of 0.00 mol % to 35.32 mol % in terms of $Ta_2O_5$, and an oxide of V of 0.00 mol % to 2.65 mol % in terms of $V_2O_5$.

In the dielectric ceramic composition according to the first embodiment of the present invention, the total content ratio of the oxide of Ca in terms of CaO, the oxide of Sr in terms of SrO, and the oxide of Ba in terms of BaO relative to the total number of moles of the first component when converted into the above oxides is 48.72 mol % to 51.22 mol % and preferably 49.37 mol % to 50.62 mol %.

In the dielectric ceramic composition according to the first embodiment of the present invention, the total content ratio of the oxide of Ti in terms of $TiO_2$, the oxide of Zr in terms of $ZrO_2$, and the oxide of Sn in terms of $SnO_2$ relative to the total number of moles of the first component when converted into the above oxides is 15.97 mol % to 17.36 mol % and preferably 16.32 mol % to 17.01 mol %. In the case where the first component includes Sn, the content ratio of the oxide of Sn in terms of $SnO_2$ relative to total number of moles of the oxide of Ti in terms of $TiO_2$, the oxide of Zr in terms of $ZrO_2$, and the oxide of Sn in terms of $SnO_2$ is 15.00 mol % or less.

In the dielectric ceramic composition according to the first embodiment of the present invention, the total content ratio of the oxide of Nb in terms of $Nb_2O_5$, the oxide of Ta in terms of $Ta_2O_5$, and the oxide of V in terms of $V_2O_5$ relative to the total number of moles of the first component when converted into the above oxides is 31.42 mol % to 35.31 mol % and preferably 32.20 mol % to 34.43 mol %. In the case where the first component includes V, the content ratio of the oxide of V in terms of $V_2O_5$ relative to total number of moles of the oxide of Nb in terms of $Nb_2O_5$, the oxide of Ta in terms of $Ta_2O_5$, and the oxide of V in terms of $V_2O_5$ is 7.50 mol % or less.

The dielectric ceramic composition according to the first embodiment of the present invention includes at least (a) component, that is, the oxide of Mn and (b) component, that is, the oxide of Cu, the oxide of Ru, or the oxide of Cu and the oxide of Ru as the second component. In other words, the dielectric ceramic composition according to the first embodiment of the present invention includes the oxide of Mn and one or both of the oxide of Cu and the oxide of Ru as the essential second component.

In the dielectric ceramic composition according to the first embodiment of the present invention, the content of the oxide of Mn is 0.005% by mass to 3.500% by mass, preferably 0.005% by mass to 2.000% by mass, and particularly preferably 0.010% by mass to 1.500% by mass in terms of MnO relative to the total mass of the first component when converted into the above oxides.

In the dielectric ceramic composition according to the first embodiment of the present invention, the content of the oxide of Cu is 0.080% by mass to 20.000% by mass, preferably 0.100% by mass to 5.000% by mass, and particularly preferably 0.200% by mass to 2.000% by mass in terms of CuO relative to the total mass of the first component when converted into the above oxides.

In the dielectric ceramic composition according to the first embodiment of the present invention, the content of the oxide of Ru is 0.300% by mass to 45.000% by mass, preferably 0.500% by mass to 20.000% by mass, and particularly preferably 1.000% by mass to 10.000% by mass in terms of $RuO_2$ relative to the total mass of the first component when converted into the above oxides.

In the dielectric ceramic composition according to the first embodiment of the present invention, in the case where the second component includes both of the oxide of Cu and the oxide of Ru, the total of the oxide of Cu and the oxide of Ru in terms of CuO and in terms of $RuO_2$ respectively is preferably 45.000% by mass or less relative to the total mass of the first component when converted into the above oxides.

The dielectric ceramic composition according to the first embodiment of the present invention includes the oxide of Mn having the above content as the second component, whereby in the case where the dielectric ceramic composition is used as a dielectric layer of the ceramic electronic components such as a laminated ceramic capacitor, the change in the electrostatic capacity is small even in a high temperature condition of 150° C. to 200° C., the change rate of the electrostatic capacity is within ±50.0% in a temperature range of −55° C. to 200° C., and the dielectric losses (tan δ) at 25° C. and 200° C. are small.

The dielectric ceramic composition according to the first embodiment of the present invention, in which the content of the first component is determined to be the above content and the oxide of Mn is included in the above content as the second component, exhibits the effects in which the change in the electrostatic capacity is small in a high temperature condition of 150° C. to 200° C., the change rate of the electrostatic capacity is within ±50.0% in a temperature range of −55° C. to 200° C., and the dielectric losses (tan δ) at 25° C. and 200° C. are small. In addition, the dielectric ceramic composition according to the first embodiment of the present invention, in which one or both of the oxide of Cu and the oxide of Ru are included as the second component in the above content, can provide the high insulation resistance value under a high temperature environment without significantly affecting the effects caused by determining the content of the first component to be the above content and including the oxide of Mn in the above content as the second component, that is, the effects in which the change in the electrostatic capacity is small in a high temperature condition of 150° C. to 200° C., the change rate of the electrostatic capacity is within ±50.0% in a temperature range of −55° C. to 200° C., and the dielectric losses at 25° C. and 200° C. are small.

The dielectric ceramic composition according to the first embodiment of the present invention includes (a) the oxide of Mn and (b) any one or both of the oxide of Cu and the oxide of Ru and, in addition to the above components, the oxides (hereinafter, also described as a (c) component) other than the (a) component and the (b) component may be optionally included as the second component. The second component is added to the dielectric ceramic composition according to the present invention for the purpose of improving the reduction resistance and other properties. The ratio of total mass of the second component other than the (b) component in terms of the oxides (that is, the total mass of the (a) component and the (c) component) is preferably 10.000% by mass or less and particularly preferably 0.100% by mass to 5.500% by mass relative to the total mass of the first component when converted into the above oxides.

The optional component (the (c) component) of the second component included in the dielectric ceramic composition according to the first embodiment of the present invention is preferably the oxides of D (D is at least one element selected from Li, Mg, Si, Cr, Al, Fe, Co, Ni, Zn, Ga, Ge, In, W, Mo, Y, Hf, La, Ce, Pr, Nd, Sm, Eu, Gd, Tb, Dy, Ho, Er, Tm, Yb, and Lu) and the oxide of Mg, the oxide of Si, and the oxide of Y are particularly preferable.

The mass of the oxide of D is a converted value of Li in terms of $Li_2O$, Mg in terms of MgO, Si in terms of $SiO_2$, Cr in terms of $Cr_2O_3$, Al in terms of $Al_2O_3$, Fe in terms of $Fe_2O_3$, Co in terms of CoO, Ni in terms of NiO, Zn in terms of ZnO, Ga in terms of $Ga_2O_3$, Ge in terms of $GeO_2$, In in terms of $In_2O_3$, W in terms of $WO_3$, Mo in terms of $MoO_3$, Y in terms of $Y_2O_3$, Hf in terms of $HfO_2$, La in terms of $La_2O_3$, Ce in terms of $CeO_2$, Pr in terms of $Pr_6O_{11}$, Nd in terms of $Nd_2O_3$, Sm in terms of $Sm_2O_3$, Eu in terms of $Eu_2O_3$, Gd in terms of $Gd_2O_3$, Tb in terms of $Tb_4O_7$, Dy in terms of $Dy_2O_3$, Ho in terms of $Ho_2O_3$, Er in terms of $Er_2O_3$, Tm in terms of $Tm_2O_3$, Yb in terms of $Yb_2O_3$, or Lu in terms of $Lu_2O_3$.

The dielectric ceramic composition according to the first embodiment of the present invention preferably exhibits existence of the tungsten bronze type crystal phase when crystal structure analysis such as X-ray diffraction is performed. The average grain size of the dielectric ceramic composition according to the first embodiment of the present invention is preferably 5 μm or less and particularly preferably 3 μm or less.

The dielectric ceramic composition according to the second embodiment of the present invention includes the first component and the second component, wherein as the first component, a compound represented by a following general formula (1):

$$A_a M^1{}_b M^2{}_c O_d \tag{1}$$

(in the formula (1), A is represented by a general formula (2):

$$i.\ Ba_{1-x-y}Sr_xCa_y \tag{2}$$

(in the formula (2), 0≤x≤0.920 and 0≤y≤0.700); $M^1$ is at least one element selected from Ti, Zr, and Sn; $M^2$ is at least one element selected from Nb, Ta, and V; and 5.70≤a≤6.30, 1.90≤b≤2.10, 7.20≤c≤8.80, and 27.45≤d≤32.50) is included (with the proviso that, when Sn is included, the content ratio of the oxide of Sn in terms of $SnO_2$ relative to the total number of moles of the oxide of Ti in terms of $TiO_2$, the oxide of Zr in terms of $ZrO_2$, and the oxide of Sn in terms of $SnO_2$ is 15.00 mol % or less and when V is included, the content ratio of the oxide of V in terms of $V_2O_5$ relative to the total number of moles of the oxide of Nb in terms of $Nb_2O_5$, the oxide of Ta in terms of $Ta_2O_5$, and the oxide of V in terms of $V_2O_5$ is 7.50 mol % or less), and as a content ratio relative to a total mass of the first component when the first component is converted into CaO, SrO, BaO, $TiO_2$, $ZrO_2$, $SnO_2$, $Nb_2O_5$, $Ta_2O_5$, and $V_2O_5$, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

The dielectric ceramic composition according to the second embodiment of the present invention includes the first component and the second component. In the dielectric ceramic composition according to the second embodiment of the present invention, among oxides included in the dielectric ceramic composition, all oxides other than the oxides included as the first component are included as the second component.

In the dielectric ceramic composition according to the second embodiment of the present invention, the first component is a compound represented by the following general formula (1):

$$A_a M^1_b M^2_c O_d \qquad (1).$$

In the general formula (1), A is represented by the general formula (2):

$$Ba_{1-x-y} Sr_x Ca_y \qquad (2)$$

(in the formula (2), 0≤x≤0.920 and 0≤y≤0.700). In other words, A may be Ba alone, a combination of any of two of Ca, Sr, and Ba (Ca and Sr, Ca and Ba, or Sr and Ba), or a combination of Ca, Sr, and Ba.

In the general formula (1), $M^1$ is at least one element selected from Ti, Zr, and Sn. Here, one or more elements selected from Ti and Zr are essential as $M^1$. More specifically, $M^1$ is Ti alone, Zr alone, a combination of Ti and Sn, a combination of Zr and Sn, a combination of Ti and Zr, or a combination of Ti, Zr, and Sn.

In the general formula (1), $M^2$ is at least one element selected from Nb, Ta, and V. Here, one or more elements selected from Nb and Ta are essential as $M^2$. More specifically, $M^2$ is Nb alone, Ta alone, a combination of Nb and V, a combination of Ta and V, a combination of Nb and Ta, or a combination of Nb, Ta, and V.

In the general formula (1), a is in the range of 5.70≤a≤6.30, b is in the range of 1.90≤b≤2.10, c is in the range of 7.20≤c≤8.80, and d is in the range of 27.45≤d≤32.50.

In the case where the dielectric ceramic composition according to the second embodiment of the present invention includes Sn, the content ratio of the oxide of Sn in terms of $SnO_2$ relative to total number of moles of the oxide of Ti in terms of $TiO_2$, the oxide of Zr in terms of $ZrO_2$, and the oxide of Sn in terms of $SnO_2$ is 15.00 mol % or less. In the case where the dielectric ceramic composition according to the second embodiment of the present invention includes V, the content ratio of the oxide of V in terms of $V_2O_5$ relative to total number of moles of the oxide of Nb in terms of $Nb_2O_5$, the oxide of Ta in terms of $Ta_2O_5$, and the oxide of V in terms of $V_2O_5$ is 7.50 mol % or less.

The dielectric ceramic composition according to the second embodiment of the present invention includes at least the (a) component, that is, the oxide of Mn and the (b) component, that is, the oxide of Cu, the oxide of Ru, or the oxide of Cu and the oxide of Ru as the second component. In other words, the dielectric ceramic composition according to the second embodiment of the present invention includes the oxide of Mn and one or both of the oxide of Cu and the oxide of Ru as the essential second component.

In the dielectric ceramic composition according to the second embodiment of the present invention, the content of the oxide of Mn is 0.005% by mass to 3.500% by mass, preferably 0.005% by mass to 2.000% by mass, and particularly preferably 0.010% by mass to 1.500% by mass in terms of MnO relative to the total mass of the first component when the first component is converted into CaO, SrO, BaO, $TiO_2$, $ZrO_2$, $SnO_2$, $Nb_2O_5$, $Ta_2O_5$, and $V_2O_5$.

In the dielectric ceramic composition according to the second embodiment of the present invention, the content of the oxide of Cu is 0.080% by mass to 20.000% by mass, preferably 0.100% by mass to 5.000% by mass, and particularly preferably 0.200% by mass to 2.000% by mass in terms of CuO relative to the total mass of the first component when the first component is converted into CaO, SrO, BaO, $TiO_2$, $ZrO_2$, $SnO_2$, $Nb_2O_5$, $Ta_2O_5$, and $V_2O_5$.

In the dielectric ceramic composition according to the second embodiment of the present invention, the content of the oxide of Ru is 0.300% by mass to 45.000% by mass, preferably 0.500% by mass to 20.000% by mass, and particularly preferably 1.000% by mass to 10.000% by mass in terms of $RuO_2$ relative to the total mass of the first component when the first component is converted into CaO, SrO, BaO, $TiO_2$, $ZrO_2$, $SnO_2$, $Nb_2O_5$, $Ta_2O_5$, and $V_2O_5$.

In the dielectric ceramic composition according to the second embodiment of the present invention, in the case where the second component includes both of the oxide of Cu and the oxide of Ru, the total of the oxide of Cu and the oxide of Ru in terms of CuO and in terms of $RuO_2$ respectively is preferably 45.000% by mass or less relative to the total mass of the first component when the first component is converted into CaO, SrO, BaO, $TiO_2$, $ZrO_2$, $SnO_2$, $Nb_2O_5$, $Ta_2O_5$, and $V_2O_5$.

The dielectric ceramic composition according to the second embodiment of the present invention includes the (a) component, that is, the oxide of Mn having the above content as the second component, whereby in the case where the dielectric ceramic composition is used as a dielectric layer of the ceramic electronic components such as a laminated ceramic capacitor, the change in the electrostatic capacity is small even in a high temperature condition of 150° C. to 200° C., the change rate of the electrostatic capacity is within ±50.0% in a temperature range of −55° C. to 200° C., and the dielectric losses (tan δ) at 25° C. and 200° C. are small.

The dielectric ceramic composition according to the second embodiment of the present invention, in which the content of the first component is determined to be the above content and the oxide of Mn is included in the above content as the second component, exhibits the effects in which the change in the electrostatic capacity is small in a high temperature condition of 150° C. to 200° C., the change rate of the electrostatic capacity is within ±50.0% in a temperature range of −55° C. to 200° C., and the dielectric losses (tan δ) at 25° C. and 200° C. are small. In addition, the dielectric ceramic composition according to the second embodiment of the present invention, in which one or both of the oxide of Cu and the oxide of Ru are included as the second component in the above content, can provide the high insulation resistance value under a high temperature environment without significantly affecting the effects caused by determining the content of the first component to be the above content and including the oxide of Mn in the above content as the second component, that is, the effects in which the change in the electrostatic capacity is small in a high temperature condition of 150° C. to 200° C., the change rate of the electrostatic capacity is within ±50.0% in a temperature range of −55° C. to 200° C., and the dielectric losses at 25° C. and 200° C. are small.

The dielectric ceramic composition according to the second embodiment of the present invention includes (a) the oxide of Mn and (b) any one or both of the oxide of Cu and the oxide of Ru and, in addition to the above components, the oxides (hereinafter, also described as a (c) component) other than the oxides of the (a) component and the (b) component may be optionally included as the second component. The second component is added to the dielectric ceramic composition according to the present invention for the purpose of improving the reduction resistance and other properties. The total mass of the second component other than the (b) component in terms of the oxides (that is, the total mass of the (a) component and the (c) component) is preferably 10.000% by mass or less and particularly preferably 0.100% by mass to 5.500% by mass relative to the total mass of the first component when the first component is converted into CaO, SrO, BaO, $TiO_2$, $ZrO_2$, $SnO_2$, $Nb_2O_5$, $Ta_2O_5$, and $V_2O_5$.

The optional component (the (c) component) of the second component included in the dielectric ceramic composition according to the second embodiment of the present invention is preferably the oxides of D (D is at least one element selected from Li, Mg, Si, Cr, Al, Fe, Co, Ni, Zn, Ga, Ge, In, W, Mo, Y, Hf, La, Ce, Pr, Nd, Sm, Eu, Gd, Tb, Dy, Ho, Er, Tm, Yb, and Lu) and the oxide of Mg, the oxide of Si, and the oxide of Y are particularly preferable.

The mass of the oxide of D is a converted value of Li in terms of $Li_2O$, Mg in terms of MgO, Si in terms of $SiO_2$, Cr in terms of $Cr_2O_3$, Al in terms of $Al_2O_3$, Fe in terms of $Fe_2O_3$, Co in terms of CoO, Ni in terms of NiO, Zn in terms of ZnO, Ga in terms of $Ga_2O_3$, Ge in terms of $GeO_2$, In in terms of $In_2O_3$, W in terms of $WO_3$, Mo in terms of $MoO_3$, Y in terms of $Y_2O_3$, Hf in terms of $HfO_2$, La in terms of $La_2O_3$, Ce in terms of $CeO_2$, Pr in terms of $Pr_6O_{11}$, Nd in terms of $Nd_2O_3$, Sm in terms of $Sm_2O_3$, Eu in terms of $Eu_2O_3$, Gd in terms of $Gd_2O_3$, Tb in terms of $Tb_4O_7$, Dy in terms of $Dy_2O_3$, Ho in terms of $Ho_2O_3$, Er in terms of $Er_2O_3$, Tm in terms of $Tm_2O_3$, Yb in terms of $Yb_2O_3$, or Lu in terms of $Lu_2O_3$.

The dielectric ceramic composition according to the second embodiment of the present invention exhibits existence of the tungsten bronze type crystal phase when crystal structure analysis such as X-ray diffraction is performed. The average grain size thereof is preferably 5 μm or less and particularly preferably 3 μm or less.

The dielectric ceramic composition according to the third embodiment of the present invention includes the first component and the second component, wherein a compound represented by a following general formula (3):

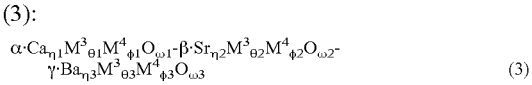

(in the formula (3), η1, η2, and η3 each independently are values within a range of 5.70 to 6.30; θ1, θ2, and θ3 each independently are values within a range of 0.95 to 1.05; φ1, φ2, and φ3 each independently are values within a range of 0.90 to 1.10; ω1, ω2, and ω3 each independently are values within a range of 27.45 to 32.50; $M^3$ is represented by a general formula (4):

(in the formula (4), $0 \leq \rho \leq 2.0$ and $0 \leq \sigma \leq 0.3$); $M^4$ is represented by a general formula (5):

(in the formula (5), $0 \leq \pi \leq 8.0$ and $0 \leq \psi \leq 0.6$); and α, β, and γ satisfy α+β+γ=1.00), and when an arbitrary point in a ternary composition diagram is represented as (α, β, γ), the compound existing within a range surrounded by line segments linking a point A=(0.05, 0.95, 0.00), a point B=(0.70, 0.30, 0.00), a point C=(0.70, 0.00, 0.30), a point D=(0.00, 0.00, 1.00), and a point E=(0.00, 0.90, 0.10) is included as the first component; and as a content ratio relative to a total mass of the first component when the first component is converted into CaO, SrO, BaO, $TiO_2$, $ZrO_2$, $SnO_2$, $Nb_2O_5$, $Ta_2O_5$, and $V_2O_5$, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

The dielectric ceramic composition according to the third embodiment of the present invention includes the first component and the second component. In the dielectric ceramic composition according to the third embodiment of the present invention, among oxides included in the dielectric ceramic composition, all oxides other than the oxides included as the first component are included as the second component.

Figure 1:
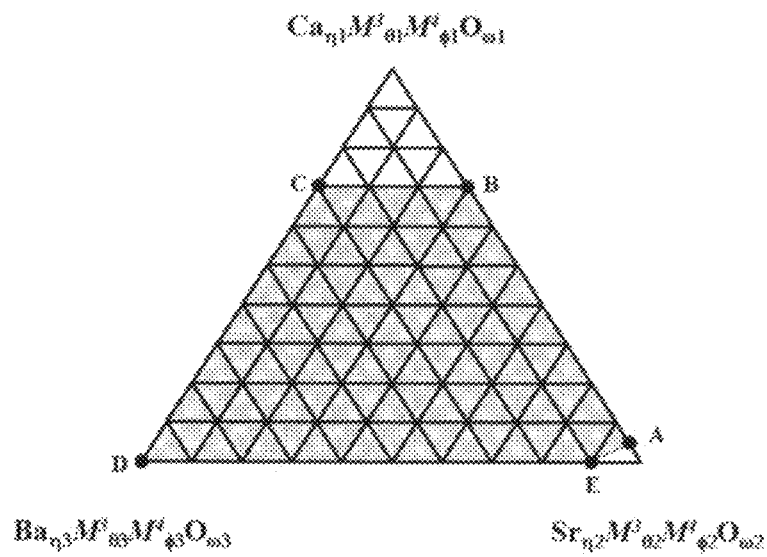
FIG. 1 is a triangle diagram illustrating the suitable composition range of the dielectric ceramic composition according to the present invention.

The first component of the dielectric ceramic composition according to the third embodiment of the present invention is a compound existing within the range surrounded by line segments linking a point A=(0.05, 0.95, 0.00), a point B=(0.70, 0.30, 0.00), a point C=(0.70, 0.00, 0.30), a point D=(0.00, 0.00, 1.00), and a point E=(0.00, 0.90, 0.10) (hereinafter, may also be described as a compound existing within the range surrounded by line segments linking the point A, the point B, the point C, the point D, and the point E on the ternary composition diagram illustrated in FIG. 1) when a point on the ternary composition diagram of $Ca_{\eta1}M^3_{\theta1}M^4_{\phi1}O_{\omega1}$—$Sr_{\eta2}M^3_{\theta2}M^4_{\phi2}O_{\omega2}$—$Ba_{\eta3}M^3_{\theta3}M^4_{\phi3}O_{\omega3}$ illustrated in FIG. 1 is represented by (α, β, γ) (here, α, β, and γ satisfy α+β+γ=1.00). The first component having the composition existing within the above range allows the relative dielectric constant at 25° C. to be 100 or more and thus exhibits ferroelectricity.

Figure 2:
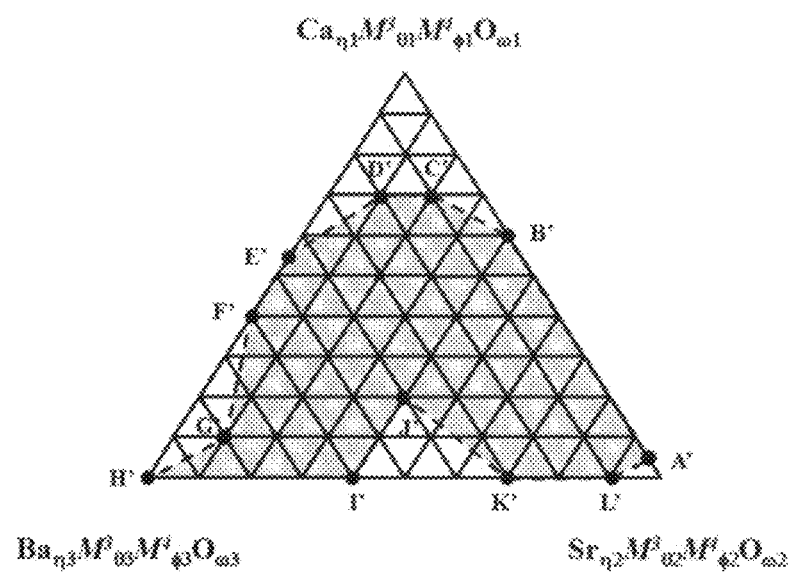
FIG. 2 is a triangle diagram illustrating the further suitable composition range of the dielectric ceramic composition according to the present invention.

The first component of the dielectric ceramic composition according to the third embodiment of the present invention is preferably a compound existing within the range surrounded by line segments linking a point A'=(0.05, 0.95, 0.00), a point B'=(0.60, 0.40, 0.00), a point C'=(0.70, 0.20, 0.10), a point D'=(0.70, 0.10, 0.20), a point E'=(0.55, 0.00, 0.45), a point F'=(0.40, 0.00, 0.60), a point G'=(0.10, 0.10, 0.80), a point H'=(0.00, 0.00, 1.00), a point I'=(0.00, 0.40, 0.60) a point J'=(0.20, 0.40, 0.40), a point K'=(0.00, 0.70, 0.30), and a point L'=(0.00, 0.90, 0.10) (hereinafter, may also be described as a compound existing within the range surrounded by line segments linking the point A', the point B', the point C', the point D', the point E', the point F', the point G', the point H', the point I', the point J', the point K', and the point L' on the ternary composition diagram illustrated in FIG. 2) on the ternary composition diagram of $Ca_{\eta1}M^3{}_{\theta1}M^4{}_{\phi1}O_{\omega1}$—$Sr_{\eta2}M^3{}_{\theta2}M^4{}_{\phi2}O_{\omega2}$—$Ba_{\eta3}M^3{}_{\theta3}M^4{}_{\phi3}O_{\omega3}$ illustrated in FIG. 2. The first component having the composition existing within the above range is likely to provide the relative dielectric constant at 25° C. of 200 or more and thus exhibits ferroelectricity. The ternary composition diagram of "$Ca_{\eta1}M^3{}_{\theta1}M^4{}_{\phi1}O_{\omega1}$—$Sr_{\eta2}M^3{}_{\theta2}M^4{}_{\phi2}O_{\omega2}$—$Ba_{\eta3}M^3{}_{\theta3}M^4{}_{\phi3}O_{\omega3}$" illustrated in FIG. 2 is the same diagram as the ternary composition diagram of "$Ca_{\eta1}M^3{}_{\theta1}M^4{}_{\phi1}O_{\omega1}$—$Sr_{\eta2}M^3{}_{\theta2}M^4{}_{\phi2}O_{\omega2}$—$Ba_{\eta3}M^3{}_{\theta3}M^4{}_{\phi3}O_{\omega3}$" illustrated in FIG. 1.

Here, in the ternary composition diagram of "$Ca_{\eta1}M^3{}_{\theta1}M^4{}_{\phi1}O_{\omega1}$—$Sr_{\eta2}M^3{}_{\theta2}M^4{}_{\phi2}O_{\omega2}$—$Ba_{\eta3}M^3{}_{\theta3}M^4{}_{\phi3}O_{\omega3}$" according to the dielectric ceramic composition of the third embodiment of the present invention, $\eta1$, $\eta2$, and $\Theta3$ each independently are values within the range of 5.70 to 6.30. $\theta1$, $\theta2$, and $\theta3$ each independently are values within the range of 0.95 to 1.05. $\phi1$, $\phi2$, and $\phi3$ each independently are values within the range of 0.90 to 1.10. $\omega1$, $\omega2$, and $\omega3$ each independently are values within the range of 27.45 to 32.50. $M^3$ is a general formula (4):

i. $Ti_{2-\rho-\sigma}Zr_\rho Sn_\sigma$ (4)

(in the formula (4), $0\le\rho\le2.0$ and $0\le\sigma\le0.3$). $M^4$ is a general formula (5):

ii. $Nb_{8-\pi-\psi}Ta_\pi V_\psi$ (5)

(in the formula (5), $0\le\pi\le8.0$ and $0\le\psi\le0.6$).

The dielectric ceramic composition according to the third embodiment of the present invention includes at least the (a) component, that is, the oxide of Mn and the (b) component, that is, the oxide of Cu, the oxide of Ru, or the oxide of Cu and the oxide of Ru as the second component. In other words, the dielectric ceramic composition according to the third embodiment of the present invention includes the oxide of Mn and one or both of the oxide of Cu and the oxide of Ru as the essential second component.

In the dielectric ceramic composition according to the third embodiment of the present invention, the content of the oxide of Mn is 0.005% by mass to 3.500% by mass, preferably 0.005% by mass to 2.000% by mass, and particularly preferably 0.010% by mass to 1.500% by mass in terms of MnO relative to the total mass of the first component when the first component is converted into CaO, SrO, BaO, $TiO_2$, $ZrO_2$, $SnO_2$, $Nb_2O_5$, $Ta_2O_5$, and $V_2O_5$.

In the dielectric ceramic composition according to the third embodiment of the present invention, the content of the oxide of Cu is 0.080% by mass to 20.000% by mass, preferably 0.100% by mass to 5.000% by mass, and particularly preferably 0.200% by mass to 2.000% by mass in terms of CuO relative to the total mass of the first component when the first component is converted into CaO, SrO, BaO, $TiO_2$, $ZrO_2$, $SnO_2$, $Nb_2O_5$, $Ta_2O_5$, and $V_2O_5$.

In the dielectric ceramic composition according to the third embodiment of the present invention, the content of the oxide of Ru is 0.300% by mass to 45.000% by mass, preferably 0.500% by mass to 20.000% by mass, and particularly preferably 1.000% by mass to 10.000% by mass in terms of $RuO_2$ relative to the total mass of the first component when the first component is converted into CaO, SrO, BaO, $TiO_2$, $ZrO_2$, $SnO_2$, $Nb_2O_5$, $Ta_2O_5$, and $V_2O_5$.

In the dielectric ceramic composition according to the third embodiment of the present invention, in the case where the second component includes both of the oxide of Cu and the oxide of Ru, the total of the oxide of Cu and the oxide of Ru in terms of CuO and in terms of $RuO_2$ respectively is preferably 45.000% by mass or less relative to the total mass of the first component when the first component is converted into CaO, SrO, BaO, $TiO_2$, $ZrO_2$, $SnO_2$, $Nb_2O_5$, $Ta_2O_5$, and $V_2O_5$.

The dielectric ceramic composition according to the third embodiment of the present invention includes the (a) component, that is, the oxide of Mn having the above content as the second component, whereby in the case where the dielectric ceramic composition is used as a dielectric layer of the ceramic electronic components such as a laminated ceramic capacitor, the change in the electrostatic capacity is small even in a high temperature condition of 150° C. to 200° C., the change rate of the electrostatic capacity is within ±50.0% in a temperature range of −55° C. to 200° C., and the dielectric losses (tan δ) at 25° C. and 200° C. are small.

The dielectric ceramic composition according to the third embodiment of the present invention, in which the content of the first component is determined to be the above content and the oxide of Mn is included in the above content as the second component, exhibits the effects in which the change in the electrostatic capacity is small in a high temperature condition of 150° C. to 200° C., the change rate of the electrostatic capacity is within ±50.0% in a temperature range of −55° C. to 200° C., and the dielectric losses (tan δ) at 25° C. and 200° C. are small. In addition, the dielectric ceramic composition according to the third embodiment of the present invention, in which one or both of the oxide of Cu and the oxide of Ru are included as the second component in the above content, can provide the high insulation resistance value under a high temperature environment without significantly affecting the effects caused by determining the content of the first component to be the above content and including the oxide of Mn in the above content as the second component, that is, the effects in which the change in the electrostatic capacity is small in a high temperature condition of 150° C. to 200° C., the change rate of the electrostatic capacity is within ±50.0% in a temperature range of −55° C. to 200° C., and the dielectric losses at 25° C. and 200° C. are small.

The dielectric ceramic composition according to the third embodiment of the present invention includes (a) the oxide of Mn and (b) any one or both of the oxide of Cu and the oxide of Ru and, in addition to the above components, the oxides (hereinafter, also described as a (c) component) other than the (a) component and the (b) component may be optionally included as the second component. The second component is added to the dielectric ceramic composition according to the present invention for the purpose of improving the reduction resistance and other properties. The total mass of the second component other than the (b) component in terms of the oxides (that is, the total mass of the (a) component and the (c) component) is preferably 10.000% by mass or less and particularly preferably 0.100% by mass to 5.500% by mass relative to the total mass of the first component when the first component is converted into CaO, SrO, BaO, $TiO_2$, $ZrO_2$, $SnO_2$, $Nb_2O_5$, $Ta_2O_5$, and $V_2O_5$.

The optional component (the (c) component) of the second component included in the dielectric ceramic composition according to the third embodiment of the present invention is preferably the oxides of D (D is at least one element selected from Li, Mg, Si, Cr, Al, Fe, Co, Ni, Zn, Ga, Ge, In, W, Mo, Y, Hf, La, Ce, Pr, Nd, Sm, Eu, Gd, Tb, Dy, Ho, Er, Tm, Yb, and Lu) and the oxide of Mg, the oxide of Si, and the oxide of Y are particularly preferable.

The mass of the oxide of D is a converted value of Li in terms of $Li_2O$, Mg in terms of MgO, Si in terms of $SiO_2$, Cr in terms of $Cr_2O_3$, Al in terms of $Al_2O_3$, Fe in terms of $Fe_2O_3$, Co in terms of CoO, Ni in terms of NiO, Zn in terms of ZnO, Ga in terms of $Ga_2O_3$, Ge in terms of $GeO_2$, In in terms of $In_2O_3$, W in terms of $WO_3$, Mo in terms of $MoO_3$, Y in terms of $Y_2O_3$, Hf in terms of $HfO_2$, La in terms of $La_2O_3$, Ce in terms of $CeO_2$, Pr in terms of $Pr_6O_{11}$, Nd in terms of $Nd_2O_3$, Sm in terms of $Sm_2O_3$, Eu in terms of $Eu_2O_3$, Gd in terms of $Gd_2O_3$, Tb in terms of $Tb_4O_7$, Dy in terms of $Dy_2O_3$, Ho in terms of $Ho_2O_3$, Er in terms of $Er_2O_3$, Tm in terms of $Tm_2O_3$, Yb in terms of $Yb_2O_3$, or Lu in terms of $Lu_2O_3$.

The dielectric ceramic composition according to the third embodiment of the present invention exhibits existence of the tungsten bronze type crystal phase when crystal structure analysis such as X-ray diffraction is performed. The average grain size thereof is preferably 5 μm or less and particularly preferably 3 μm or less.

In the dielectric ceramic composition according to the first embodiment of the present invention, the dielectric ceramic composition according to the second embodiment of the present invention, and the dielectric ceramic composition according to the third embodiment of the present invention, as the relative dielectric constant at 25° C. becomes higher, the dielectric ceramic composition becomes more preferable. The relative dielectric constant is 100.0 or more and preferably 200.0 or more, and depending on the composition, preferably 300.0 or more, further preferably 400.0 or more, and further preferably 500.0 or more.

In the dielectric ceramic composition according to the first embodiment of the present invention, the dielectric ceramic composition according to the second embodiment of the present invention, and the dielectric ceramic composition according to the third embodiment of the present invention, the change rate of the electrostatic capacity is within ±50.0% and preferably within the range of −33.0% to 22.0% in the temperature range of −55° C. to 200° C. In the present invention, the change rate of the electrostatic capacity refers to a value obtained by the method described below.

In the dielectric ceramic composition according to the first embodiment of the present invention, the dielectric ceramic composition according to the second embodiment of the present invention, and the dielectric ceramic composition according to the third embodiment of the present invention, the dielectric loss (tan δ) at 25° C. is 10.0% or less and the dielectric loss (tan δ) at 200° C. is 10.0% or less, which provides excellent high-frequency properties.

In the dielectric ceramic composition according to the first embodiment of the present invention, the dielectric ceramic composition according to the second embodiment of the present invention, and the dielectric ceramic composition according to the third embodiment of the present invention, the insulation resistance value at 200° C. is 100 MΩ or more, preferably 200 MΩ or more, and particularly preferably 1,000 MΩ or more.

The dielectric ceramic composition according to the first embodiment of the present invention, the dielectric ceramic composition according to the second embodiment of the present invention, and the dielectric ceramic composition according to the third embodiment of the present invention are suitable for the electronic components for which the small change in electrostatic capacity even under a high temperature condition of 150° C. to 200° C., the change rate of the electrostatic capacity within a range of −50.0% to 50.0% in a temperature range of −55° C. to 200° C., the small dielectric losses at 25° C. and 200° C., and in addition the high insulation resistance value under a high temperature environment are required.

The dielectric ceramic composition according to the first embodiment of the present invention, the dielectric ceramic composition according to the second embodiment of the present invention, and the dielectric ceramic composition according to the third embodiment of the present invention can be fired under a reducing atmosphere.

(External Electrode 4)

The external electrode 4 is formed by applying a conductive paste for the external electrode to the edge after the laminated body 10 is co-fired and firing the applied paste. The present invention, however, is not limited thereto. The external electrode 4 may also be formed by heat treatment using a paste including a thermosetting resin or a thermoplastic resin. The conductive component used for the conductive paste for the external electrode is not particularly limited. For example, pure metals such as nickel, copper, silver, palladium, platinum, and gold and, in addition to these metals, alloys, mixtures, or complexes including these metal components may be used. As other additives, glass frit may be added to the conductive paste, if necessary. The external electrode 4 may also be co-fired together with the laminated body 10.

(Method for Producing Ceramic Capacitor 1)

The ceramic capacitor 1 is produced by known methods except using the dielectric ceramic composition according to the first embodiment of the present invention, the dielectric ceramic composition according to the second embodiment of the present invention, or the dielectric ceramic composition according to the third embodiment of the present invention. Hereinafter, one example will be described.

First, starting materials for forming the dielectric layer 3 are provided. Examples of the starting materials include oxides such as CaO, SrO, BaO, $TiO_2$, $ZrO_2$, $SnO_2$, $Nb_2O_5$, $Ta_2O_5$, and $V_2O_5$, and carbonates and nitrates, or the like, which generate these oxides by firing.

These starting materials are weighed so as to be a target composition and mixed. The obtained mixture is calcinated at a temperature of about 700° C. to about 900° C. for about 3 hours to about 6 hours in the air. Subsequently, the obtained product is finely pulverized and the obtained dielectric raw material is used as the raw material for the first component.

In addition, a Mn compound such as MnO and $MnCO_3$ as a Mn source, a Cu compound such as CuO, $Cu_2O$, $Cu(NO_3)_2$, $Cu(OH)_2$, and $CuCO_3$ as a Cu source in the case where the oxide of Cu is included as the second component, a Ru compound such as $RuO_2$, $RuO_4$, $Ru_3(CO)_{12}$ as a Ru source in the case where the oxide of Ru is included as the second component, and compounds including Li, Mg, Si, Cr, Al, Fe, Co, Ni, Zn, Ga, Ge, In, W, Mo, Y, Hf, La, Ce, Pr, Nd, Sm, Eu, Gd, Tb, Dy, Ho, Er, Tm, Yb, Lu or the like to be added, if necessary, are provided as a raw material for the second component.

Subsequently, the raw materials for the first component and the raw materials for the second component are kneaded and dispersed in an appropriate binder component to prepare a dielectric paste or a dielectric slurry. In the dielectric paste or the dielectric slurry, additives such as a plasticizer may be included, if necessary.

Subsequently, the obtained dielectric paste or dielectric slurry is formed into a sheet-like shape. Subsequently, a conductor pattern is formed using the conductive paste for the internal electrode described above on the surface of the obtained green sheet. This operation is repeated predetermined times to stack the sheets, which are pressed to be consolidated to yield an unfired laminated body (hereinafter, this laminated body is referred to as a green chip).

Subsequently, debinding is performed on the green chip, if necessary. The conditions for the debinding is not particularly limited. Examples of the conditions include heat treatment at a retention temperature of 180° C. to 400° C. for 1 hour to 3 hours.

Subsequently, the green chip is fired at about 1,150° C. to about 1,350° C. under a reducing atmosphere to provide a fired laminated body 10 (hereinafter, referred to as a sintered compact 10).

Thereafter, the sintered compact 10 is subjected to re-oxidation treatment (hereinafter, referred to as annealing), if necessary. The annealing conditions may be known conditions widely used in the art. For example, oxygen partial pressure at the time of annealing is preferably set to higher oxygen partial pressure than the oxygen partial pressure at the time of firing and the holding temperature is preferably set to 1,100° C. or less.

The sintered compact 10 obtained as described above is subjected to end polishing and thereafter the conductive paste for the external electrode is applied. The applied paste is fired to form the external electrode 4. The above-described plating layer is formed on the surface of the external electrode 4, if necessary.

Thus, obtained ceramic capacitor 1 is implemented on, for example, a printed circuit board by, for example, soldering and used for various electronic devices and the like.

As described above, the embodiments of the present invention have described. The present invention, however, is not limited to the above-described embodiments at all and is used for various applications without departing from the scope of the present invention.

For example, although the ceramic capacitor has been described in the above description, the present invention is applicable for other ceramic electronic components such as an inductor and an actuator.

Hereinafter, the present invention will be described with reference to specific experimental examples. However, the present invention in not limited thereto. The compositions of the dielectric ceramic composition described below is presumed by the raw material composition (feed composition) and crystal structure analysis. The same applies in the present specification.

EXAMPLE

First, confirmation tests for determination of the content of the first component and the effect of addition of the oxide of Mn were conducted (Reference Samples 1 to 90 and Reference Samples 91 to 107).

Reference Example 1

(1) Preparation of Reference Samples 1 to 90 of Dielectric Ceramic Composition

As the starting materials of the first component, each powder of $CaCO_3$, $SrCO_3$, $BaCO_3$, $TiO_2$, $ZrO_2$, $SnO_2$, $Nb_2O_5$, $Ta_2O_5$, and $V_2O_5$ was weighed so that the ratio of each powder in terms of the oxide was as listed in Table 1, Table 3, and Table 5 and the resultant mixture was wet-blended for 20 hours with pure water using a ball mill.

Subsequently, each of the blends was dried at 100° C. and thereafter calcinated at 750° C. to 900° C. for 3 hours in the air. The obtained product was similarly finely pulverized again with the ball mill to prepare the dielectric raw material for the first component.

As the second component, a mixture made by weighing and mixing 18.2 mg of $MnCO_3$, 32 mg of MgO, 58.6 mg of $SiO_2$, and 89.5 mg $Y_2O_3$ was provided and the mixture was used as the raw material for second component. Here, in Reference Sample 43, only three components of $MnCO_3$, MgO, and $Y_2O_3$ excluding $SiO_2$ were used as the raw materials for the second component. In Reference Sample 44, only three components of $MnCO_3$, $SiO_2$, and $Y_2O_3$ excluding MgO were used as the raw materials for the second component. In Reference Sample 45, only three components of $MnCO_3$, MgO, and $SiO_2$ excluding $Y_2O_3$ were used. In Reference Samples 78 and 79, only three components of MgO, $SiO_2$, and $Y_2O_3$ excluding $MnCO_3$ were used. Of the raw material for the second component, the amount of $MnCO_3$ was changed to 0.404 mg in Reference Sample 41, the amount of $MnCO_3$ was changed to 0.198 g in Reference Sample 42, and the amount of $MnCO_3$ was changed to 2.055 g in Reference Sample 80.

A poly(vinyl alcohol) aqueous solution was prepared by charging ion-exchanged water and poly(vinyl alcohol) in a container so that the poly(vinyl alcohol) concentration was 6% by mass and mixing the resultant mixture at 90° C. for 1 hour.

Then, 25 g of each of the dielectric raw materials for the first component and the raw material for the second component having the above-described amount were mixed. The poly(vinyl alcohol) aqueous solution was added to the raw material mixture so that the concentration of the poly(vinyl alcohol) aqueous solution was 10% by mass relative to the resultant mixture and the resultant product was mixed and granulated in a mortar to prepare a granulated powder.

Furthermore, the obtained granulated powder was charged in a mold having a diameter of 14.0 mm and press-molded at a pressure of 1 ton/$cm^2$ to provide a disk-shaped green compact.

Subsequently, the obtained green compact was fired in a reducing atmosphere to prepare a sintered compact. In this firing, the temperature increasing rate, the holding temperature, and the holding time were set to 300° C./h, 1,150° C. to 1,300° C., and two hours, respectively. As an atmosphere gas, moistened hydrogen/nitrogen mixture gas (hydrogen concentration 0.5%) was used and a wetter (wetter temperature 35° C.) was used for the moistening.

Subsequently, with respect to the obtained sintered compact, In—Ga electrodes having a diameter of 8 mm were applied to the two main surfaces of the sintered compact to provide a disk-shaped ceramic capacitor of respective Reference Samples 1 to 90.

(2) Analysis of Reference Samples 1 to 90 of Dielectric Ceramic Composition

With respect to the disk-shaped ceramic capacitors of corresponding Reference Samples 1 to 90 obtained as described above, each of the grain size, the crystal phase, the relative dielectric constant, the change rate of the electrostatic capacity, and the dielectric loss (tan δ) was analyzed. The results are listed in Table 2, Table 4, and Table 6.

<Grain Size>

Figure 3:
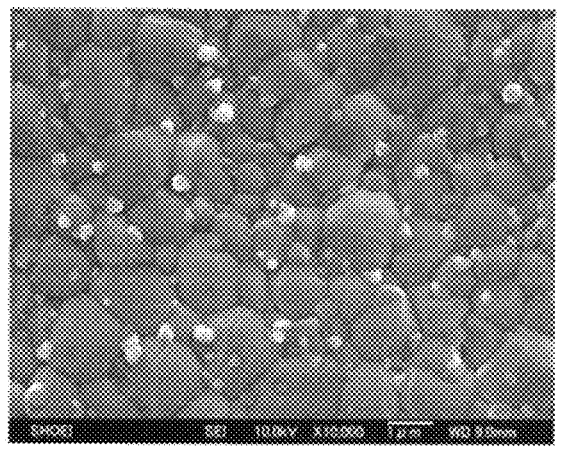
FIG. 3 is a SEM image (10,000 times) of Reference Sample 8.
Figure 4:
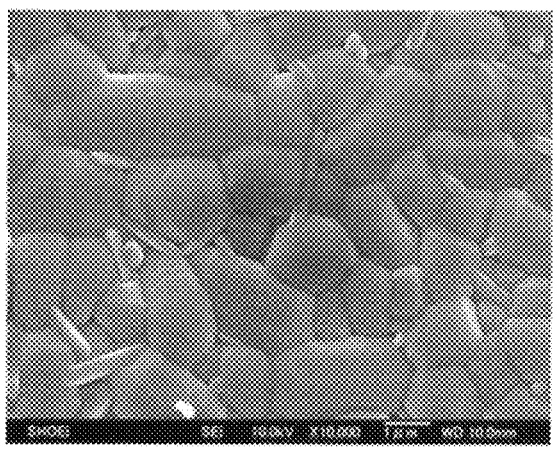
FIG. 4 is a SEM image (10,000 times) of Reference Sample 15.
Figure 5:
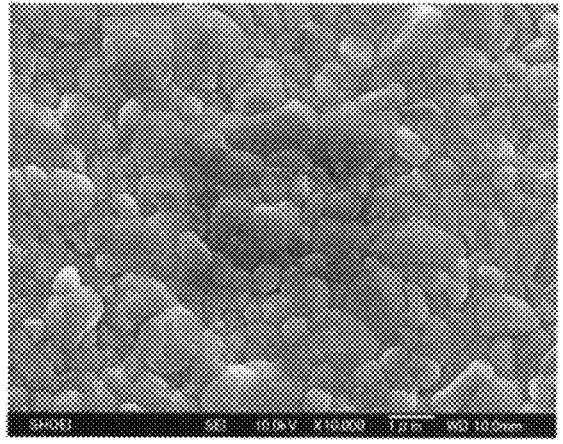
FIG. 5 is a SEM image (10,000 times) of Reference Sample 66.

The surface of each of the capacitor was observed using a scanning electron microscope (SEM). The average value of equivalent circle diameters determined from grain boundaries of randomly selected 20 crystal grains was determined to be the grain size. FIG. 3, FIG. 4, and FIG. 5 are SEM images of Reference Samples 8, 15, and 66, respectively.

<Crystal Phase>

Figure 9:
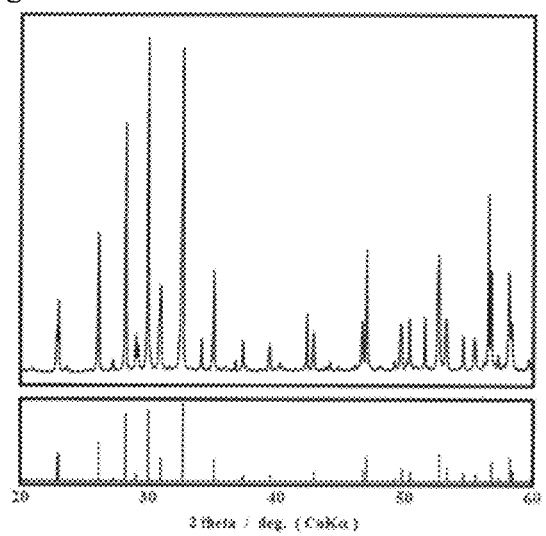
FIG. 9 is a chart illustrating the result of X-ray diffraction measurement of Reference Sample 15.

The crystal phase was specified by X-ray diffraction measurement. As a representative example, the result of the X-ray diffraction measurement of Reference Sample 15 is illustrated in FIG. 9. The lower chart in FIG. 9 is a tungsten bronze type crystal phase serving as a reference and Reference Sample 15 was confirmed to include the tungsten bronze type crystal phase. The X-ray measurement results including other samples are listed in Table 2, Table 4, and Table 6. The sign "T" in the tables indicates that the existence of the tungsten bronze type crystal phase was confirmed.

<Relative Dielectric Constant>

With respect to each of the capacitors, the electrostatic capacity C was measured at a reference temperature of 25° C. using an LCR meter (4284A, manufactured by Agilent Technologies, Inc.) at a frequency of 1 kHz and a measurement voltage of 1 $V_{rms}$. Thereafter, the relative dielectric constant was calculated based on the thickness of the sintered compact, the effective electrode area, and the electrostatic capacity C obtained by the measurement result. The relative dielectric constant at a reference temperature of 200° C. was also calculated by the same manner.

A higher relative dielectric constant is preferable and thus the capacitor having a relative dielectric constant of 100.0 or more at 25° C. is determined to be excellent.

<Change Rate of Electrostatic Capacity>

The electrostatic capacity $C_t$ at each temperature t in the temperature region of −55° C. to 200° C. was measured in the same conditions as the conditions of the relative dielectric constant measurement (4284A, manufactured by Agilent Technologies, Inc., frequency 1 kHz, and measurement voltage 1 $V_{rms}$). The change rate of the electrostatic capacity=$((C_t−C_{25})/C_{25})\times 100(\%)$ (hereinafter, the change rate of the electrostatic capacity may be described as $\Delta C_t/C_{25}$) was calculated from the electrostatic capacity $C_{25}$ at 25° C. used as the reference.

The change rate of the electrostatic capacity is preferably closer to 0 and is determined to be excellent when the change rate of the electrostatic capacity is within ±50.0%.

Figure 6:
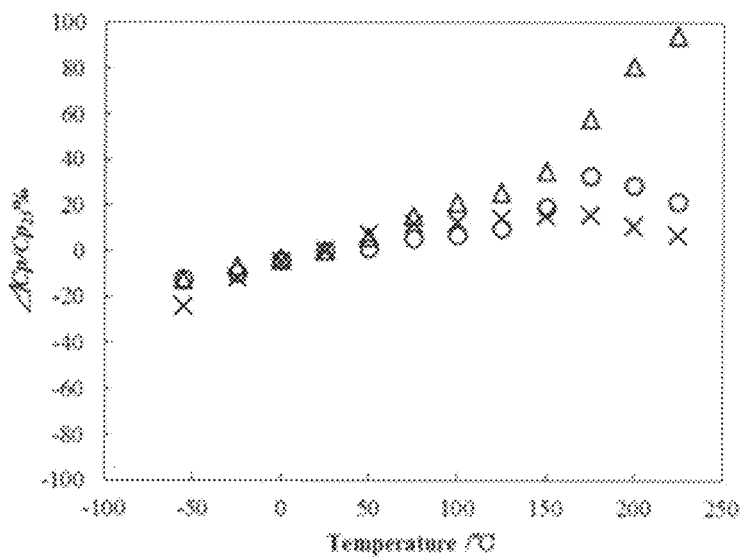
FIG. 6 is a graph illustrating trends of the change rates of the electrostatic capacity of Reference Samples 8, 15, and 66.
Figure 7:
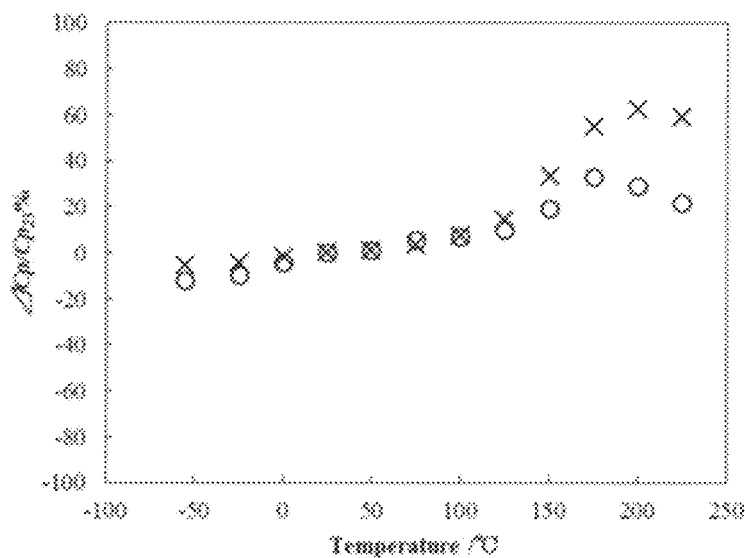
FIG. 7 is a graph illustrating trends of the change rates of the electrostatic capacity of Reference Samples 15 and 78.

With respect to Reference Samples 8, 15, and 66, the trends of the change rate of the electrostatic capacity from −55° C. to 200° C. is illustrated in FIG. 6. In FIG. 6, the signs "x (cross)", "○ (circle)", and "Δ (triangle)" refer to the change rate of the electrostatic capacities of Reference Sample 8, Reference Sample 15, and Reference Sample 66, respectively. With respect to Reference Samples 15 and 78, the trends of the change rate of the electrostatic capacity from −55° C. to 200° C. is illustrated in FIG. 7. In FIG. 7, the signs "○ (circle)" and "Δ (triangle)" refer to the change rate of the electrostatic capacities of Reference Sample 15 and Reference Sample 78, respectively.

<Dielectric Loss (Tan δ)>

With respect to each of the capacitor samples, tan δ was measured using an LCR meter (4284A, manufactured by Agilent Technologies, Inc.) at a frequency of 1 kHz and a measurement voltage of 1 $V_{rms}$. At 25° C. and 200° C., tan δ is determined to be excellent when both of tan δ are 10.0% or less.

TABLE 1

| Sample name | First component composition in terms of oxides [mol %] | | | | | | | | | Dielectric ceramic composition | Second component composition in terms of oxides [% by mass] | | |
| | CaO | SrO | BaO | TiO₂ | ZrO₂ | SnO₂ | Nb₂O₅ | Ta₂O₃ | V₂O₅ | | Oxide component species | MnO content | Total content of second component |
| --- | --- | --- | --- | --- | --- | --- | --- | --- | --- | --- | --- | --- | --- |
| Reference Sample 1 | 33.33 | 0.00 | 16.67 | 16.67 | 0.00 | 0.00 | 33.33 | 0.00 | 0.00 | $Ca_4Ba_2Ti_2Nb_8O_{30}$ | Mg, Mn, Si, Y | 0.0448 | 0.765 |
| Reference Sample 2 | 25.00 | 0.00 | 25.00 | 16.67 | 0.00 | 0.00 | 33.33 | 0.00 | 0.00 | $Ca_3Ba_3Ti_2Nb_8O_{30}$ | Mg, Mn, Si, Y | 0.0448 | 0.765 |
| Reference Sample 3 | 16.67 | 0.00 | 33.33 | 16.67 | 0.00 | 0.00 | 33.33 | 0.00 | 0.00 | $Ca_2Ba_4Ti_2Nb_8O_{30}$ | Mg, Mn, Si, Y | 0.0448 | 0.765 |
| Reference Sample 4 | 4.17 | 0.00 | 45.83 | 16.67 | 0.00 | 0.00 | 33.33 | 0.00 | 0.00 | $Ca_{0.5}Ba_{5.5}Ti_2Nb_8O_{30}$ | Mg, Mn, Si, Y | 0.0448 | 0.765 |
| Reference Sample 5 | 0.00 | 0.00 | 50.00 | 16.67 | 0.00 | 0.00 | 33.33 | 0.00 | 0.00 | $Ba_6Ti_2Nb_8O_{30}$ | Mg, Mn, Si, Y | 0.0448 | 0.765 |
| Reference Sample 6 | 16.67 | 8.33 | 25.00 | 16.67 | 0.00 | 0.00 | 33.33 | 0.00 | 0.00 | $Ca_2SrBa_3Ti_2Nb_8O_{30}$ | Mg, Mn, Si, Y | 0.0448 | 0.765 |
| Reference Sample 7 | 0.00 | 8.33 | 41.67 | 16.67 | 0.00 | 0.00 | 33.33 | 0.00 | 0.00 | $SrBa_5Ti_2Nb_8O_{30}$ | Mg, Mn, Si, Y | 0.0448 | 0.765 |
| Reference Sample 8 | 16.67 | 16.67 | 16.67 | 16.67 | 0.00 | 0.00 | 33.33 | 0.00 | 0.00 | $Ca_2Sr_2Ba_2Ti_2Nb_8O_{30}$ | Mg, Mn, Si, Y | 0.0448 | 0.765 |
| Reference Sample 9 | 7.33 | 21.33 | 21.33 | 16.67 | 0.00 | 0.00 | 33.33 | 0.00 | 0.00 | $Ca_{0.8}Sr_{2.6}Ba_{2.6}Ti_2Nb_8O_{30}$ | Mg, Mn, Si, Y | 0.0448 | 0.765 |
| Reference Sample 10 | 0.00 | 25.00 | 25.00 | 16.67 | 0.00 | 0.00 | 33.33 | 0.00 | 0.00 | $Sr_3Ba_3Ti_2Nb_8O_{30}$ | Mg, Mn, Si, Y | 0.0448 | 0.765 |
| Reference Sample 11 | 33.33 | 16.67 | 0.00 | 16.67 | 0.00 | 0.00 | 33.33 | 0.00 | 0.00 | $Ca_4Sr_2Ti_2Nb_8O_{30}$ | Mg, Mn, Si, Y | 0.0448 | 0.765 |
| Reference Sample 12 | 8.33 | 33.33 | 8.33 | 16.67 | 0.00 | 0.00 | 33.33 | 0.00 | 0.00 | $CaSr_4BaTi_2Nb_8O_{30}$ | Mg, Mn, Si, Y | 0.0448 | 0.765 |
| Reference Sample 13 | 0.00 | 37.50 | 12.50 | 16.67 | 0.00 | 0.00 | 33.33 | 0.00 | 0.00 | $Sr_{4.5}Ba_{1.5}Ti_2Nb_8O_{30}$ | Mg, Mn, Si, Y | 0.0448 | 0.765 |
| Reference Sample 14 | 8.33 | 41.67 | 0.00 | 16.67 | 0.00 | 0.00 | 33.33 | 0.00 | 0.00 | $CaSr_5Ti_2Nb_8O_{30}$ | Mg, Mn, Si, Y | 0.0448 | 0.765 |
| Reference Sample 15 | 16.67 | 33.33 | 0.00 | 16.67 | 0.00 | 0.00 | 33.33 | 0.00 | 0.00 | $Ca_2Sr_4Ti_2Nb_8O_{30}$ | Mg, Mn, Si, Y | 0.0448 | 0.765 |
| Reference Sample 16 | 16.67 | 33.33 | 0.00 | 16.67 | 0.00 | 0.00 | 32.50 | 0.80 | 0.00 | $Ca_2Sr_4Ti_2Nb_{7.8}Ta_{0.2}O_{30}$ | Mg, Mn, Si, Y | 0.0448 | 0.765 |

TABLE 1-continued

| | First component composition in terms of oxides [mol %] | | | | | | | | | Dielectric ceramic | Second component composition in terms of oxides [% by mass] | | |
|---|---|---|---|---|---|---|---|---|---|---|---|---|---|
| Sample name | CaO | SrO | BaO | TiO$_2$ | ZrO$_2$ | SnO$_2$ | Nb$_2$O$_5$ | Ta$_2$O$_3$ | V$_2$O$_5$ | composition | Oxide component species | MnO content | Total content of second component |
| Reference Sample 17 | 16.67 | 33.33 | 0.00 | 16.67 | 0.00 | 0.00 | 26.60 | 6.70 | 0.00 | Ca$_2$Sr$_4$Ti$_2$Nb$_{6.4}$Ta$_{1.6}$O$_{30}$ | Mg, Mn, Si, Y | 0.0448 | 0.765 |
| Reference Sample 18 | 16.67 | 33.33 | 0.00 | 16.67 | 0.00 | 0.00 | 20.00 | 13.33 | 0.00 | Ca$_2$Sr$_4$Ti$_2$Nb$_{4.8}$Ta$_{3.2}$O$_{30}$ | Mg, Mn, Si, Y | 0.0448 | 0.765 |
| Reference Sample 19 | 16.67 | 33.33 | 0.00 | 16.67 | 0.00 | 0.00 | 13.33 | 20.00 | 0.00 | Ca$_2$Sr$_4$Ti$_2$Nb$_{3.2}$Ta$_{4.8}$O$_{30}$ | Mg, Mn, Si, Y | 0.0448 | 0.765 |
| Reference Sample 20 | 16.67 | 33.33 | 0.00 | 16.67 | 0.00 | 0.00 | 6.67 | 26.67 | 0.00 | Ca$_2$Sr$_4$Ti$_2$Nb$_{1.6}$Ta$_{6.4}$O$_{30}$ | Mg, Mn, Si, Y | 0.0448 | 0.765 |
| Reference Sample 21 | 16.67 | 33.33 | 0.00 | 16.67 | 0.00 | 0.00 | 0.00 | 33.33 | 0.00 | Ca$_2$Sr$_4$Ti$_2$Ta$_8$O$_{30}$ | Mg, Mn, Si, Y | 0.0448 | 0.765 |
| Reference Sample 22 | 16.67 | 33.33 | 0.00 | 15.00 | 1.67 | 0.00 | 33.33 | 0.00 | 0.00 | Ca$_2$Sr$_4$Ti$_{1.8}$Zr$_{0.2}$Nb$_8$O$_{30}$ | Mg, Mn, Si, Y | 0.0448 | 0.765 |
| Reference Sample 23 | 16.67 | 33.33 | 0.00 | 13.33 | 3.33 | 0.00 | 33.33 | 0.00 | 0.00 | Ca$_2$Sr$_4$Ti$_{1.6}$Zr$_{0.4}$Nb$_8$O$_{30}$ | Mg, Mn, Si, Y | 0.0448 | 0.765 |
| Reference Sample 24 | 16.67 | 33.33 | 0.00 | 11.67 | 5.00 | 0.00 | 33.33 | 0.00 | 0.00 | Ca$_2$Sr$_4$Ti$_{1.4}$Zr$_{0.6}$Nb$_8$O$_{30}$ | Mg, Mn, Si, Y | 0.0448 | 0.765 |
| Reference Sample 25 | 16.67 | 33.33 | 0.00 | 10.00 | 6.67 | 0.00 | 33.33 | 0.00 | 0.00 | Ca$_2$Sr$_4$Ti$_{1.2}$Zr$_{0.8}$Nb$_8$O$_{30}$ | Mg, Mn, Si, Y | 0.0448 | 0.765 |
| Reference Sample 26 | 16.67 | 33.33 | 0.00 | 6.67 | 10.00 | 0.00 | 33.33 | 0.00 | 0.00 | Ca$_2$Sr$_4$Ti$_{0.8}$Zr$_{1.2}$Nb$_8$O$_{30}$ | Mg, Mn, Si, Y | 0.0448 | 0.765 |
| Reference Sample 27 | 16.67 | 33.33 | 0.00 | 3.33 | 13.33 | 0.00 | 33.33 | 0.00 | 0.00 | Ca$_2$Sr$_4$Ti$_{0.4}$Zr$_{1.6}$Nb$_8$O$_{30}$ | Mg, Mn, Si, Y | 0.0448 | 0.765 |
| Reference Sample 28 | 16.67 | 33.33 | 0.00 | 0.00 | 16.67 | 0.00 | 33.33 | 0.00 | 0.00 | Ca$_2$Sr$_4$Zr$_2$Nb$_8$O$_{30}$ | Mg, Mn, Si, Y | 0.0448 | 0.765 |
| Reference Sample 29 | 16.67 | 33.33 | 0.00 | 16.50 | 0.00 | 0.17 | 33.33 | 0.00 | 0.00 | Ca$_2$Sr$_4$Ti$_{1.98}$Sn$_{0.02}$Nb$_8$O$_{30}$ | Mg, Mn, Si, Y | 0.0448 | 0.765 |
| Reference Sample 30 | 16.67 | 33.33 | 0.00 | 16.67 | 0.00 | 0.00 | 33.00 | 0.00 | 0.33 | Ca$_2$Sr$_4$Ti$_2$Nb$_{7.96}$V$_{0.04}$O$_{30}$ | Mg, Mn, Si, Y | 0.0448 | 0.765 |

In Table 1, Table 3, and Table 5, the composition in terms of the oxide of the first component is represented by mol % of each of the oxides in terms of the oxides listed in the tables relative to the total number of moles of each of the oxide components of the first component in terms of the oxides listed in the tables. The content of the Mn oxide is represented by % by mass of the Mn oxide in terms of MnO relative to the total mass of each of the oxide components of the first component in terms of the oxides listed in the tables. The total content of the oxides of the second component is represented by % by mass of the total of the oxides of the second component relative to the total mass of each of the oxide components of the first component in terms of the oxide listed in the tables.

TABLE 2

| Sample name | Crystal phase | Grain size [μm] | Relative dielectric constant | | Change rate of the electrostatic capacity [%] | | tan δ [%] | |
|---|---|---|---|---|---|---|---|---|
| | | | 25° C. | 200° C. | −55° C. | 200° C. | 25° C. | 200° C. |
| Reference Sample 1 | T | 1.4 | 101.1 | 104.2 | −17.2 | 3.1 | 3.9 | 7.4 |
| Reference Sample 2 | T | 0.8 | 214.2 | 252.1 | −15.8 | 17.7 | 3.2 | 6.8 |
| Reference Sample 3 | T | 1.1 | 157.7 | 135.4 | −15.4 | −14.2 | 4.7 | 7.2 |
| Reference Sample 4 | T | 0.9 | 116.8 | 134.6 | −9.6 | 15.2 | 3.7 | 7.8 |
| Reference Sample 5 | T | 0.9 | 992.6 | 637.6 | −29.3 | 35.8 | 1.8 | 8.5 |
| Reference Sample 6 | T | 1.9 | 464.4 | 652.5 | −30.0 | 40.5 | 2.6 | 4.5 |
| Reference Sample 7 | T | 1.8 | 249.4 | 202.2 | 9.8 | −18.9 | 1.4 | 2.4 |
| Reference Sample 8 | T | 1.4 | 743.5 | 825.8 | −23.9 | 11.1 | 2.2 | 8.8 |
| Reference Sample 9 | T | 0.8 | 146.0 | 153.5 | 7.9 | 5.2 | 1.7 | 3.7 |
| Reference Sample 10 | T | 0.9 | 141.4 | 131.0 | −5.0 | −7.4 | 5.6 | 8.5 |
| Reference Sample 11 | T | 0.8 | 116.3 | 112.5 | 2.3 | 16.0 | 3.3 | 6.8 |
| Reference Sample 12 | T | 1.9 | 567.9 | 591.3 | −17.0 | 4.1 | 2.3 | 4.0 |
| Reference Sample 13 | T | 0.9 | 242.0 | 270.9 | −30.8 | 21.8 | 2.4 | 8.6 |
| Reference Sample 14 | T | 2.0 | 464.8 | 567.6 | −8.6 | 22.1 | 2.8 | 8.1 |
| Reference Sample 15 | T | 1.7 | 816.0 | 1,051.4 | −12.3 | 28.9 | 3.0 | 0.8 |
| Reference Sample 16 | T | 2.5 | 437.6 | 525.3 | −15.7 | 20.0 | 2.7 | 6.7 |
| Reference Sample 17 | T | 1.8 | 875.3 | 674.3 | −16.4 | −23.0 | 0.9 | 1.1 |
| Reference Sample 18 | T | 1.0 | 663.1 | 474.4 | −7.4 | −28.4 | 1.8 | 1.4 |
| Reference Sample 19 | T | 1.1 | 413.8 | 270.3 | 25.6 | −34.7 | 0.2 | 1.6 |
| Reference Sample 20 | T | 1.4 | 315.8 | 229.2 | 34.5 | −27.4 | 0.1 | 0.7 |
| Reference Sample 21 | T | 1.1 | 241.1 | 191.6 | 22.8 | −20.5 | 0.3 | 0.9 |
| Reference Sample 22 | T | 2.9 | 495.6 | 607.4 | −17.7 | 22.6 | 3.2 | 6.0 |
| Reference Sample 23 | T | 2.6 | 508.1 | 489.2 | −17.5 | −3.7 | 3.2 | 5.4 |

TABLE 2-continued

| Sample name | Crystal phase | Grain size [μm] | Relative dielectric constant 25° C. | Relative dielectric constant 200° C. | Change rate of the electrostatic capacity [%] −55° C. | Change rate of the electrostatic capacity [%] 200° C. | tan δ [%] 25° C. | tan δ [%] 200° C. |
|---|---|---|---|---|---|---|---|---|
| Reference Sample 24 | T | 2.1 | 982.0 | 853.0 | −23.1 | −13.1 | 3.0 | 3.9 |
| Reference Sample 25 | T | 2.7 | 873.8 | 732.4 | −16.6 | −16.2 | 2.4 | 3.8 |
| Reference Sample 26 | T | 1.2 | 411.5 | 326.6 | 2.6 | −20.6 | 1.1 | 2.8 |
| Reference Sample 27 | T | 1.6 | 832.5 | 691.9 | −7.9 | −16.9 | 0.9 | 3.5 |
| Reference Sample 28 | T | 1.2 | 320.9 | 247.3 | 1.9 | −22.9 | 8.1 | 2.2 |
| Reference Sample 29 | T | 1.8 | 845.7 | 1,138.7 | −23.9 | 34.6 | 3.2 | 2.8 |
| Reference Sample 30 | T | 2.0 | 882.3 | 1,192.6 | −38.1 | 35.2 | 3.3 | 3.4 |

TABLE 3

| Sample name | First component composition in terms of oxides [mol %] CaO | SrO | BaO | TiO$_2$ | ZrO$_2$ | SnO$_2$ | Nb$_2$O$_5$ | Ta$_2$O$_5$ | V$_2$O$_5$ | Dielectric ceramic composition | Second component composition in terms of oxides [% by mass] Oxide component species | MnO content | Total content of second component |
|---|---|---|---|---|---|---|---|---|---|---|---|---|---|
| Reference Sample 31 | 16.67 | 33.33 | 0.00 | 16.50 | 0.00 | 0.17 | 33.00 | 0.00 | 0.33 | Ca$_2$Sr$_4$Ti$_{1.98}$Sn$_{0.02}$Nb$_{7.96}$V$_{0.04}$O$_{30}$ | Mg, Mn, Si, Y | 0.0448 | 0.765 |
| Reference Sample 32 | 16.50 | 33.00 | 0.00 | 16.84 | 0.00 | 0.00 | 33.67 | 0.00 | 0.00 | Ca$_{1.96}$Sr$_{3.92}$Ti$_2$Nb$_8$O$_{30}$ | Mg, Mn, Si, Y | 0.0448 | 0.765 |
| Reference Sample 33 | 16.58 | 33.17 | 0.00 | 16.75 | 0.00 | 0.00 | 33.50 | 0.00 | 0.00 | Ca$_{1.98}$Sr$_{3.96}$Ti$_2$Nb$_8$O$_{30}$ | Mg, Mn, Si, Y | 0.0448 | 0.765 |
| Reference Sample 34 | 16.62 | 33.25 | 0.00 | 16.71 | 0.00 | 0.00 | 33.42 | 0.00 | 0.00 | Ca$_{1.99}$Sr$_{3.98}$Ti$_2$Nb$_8$O$_{30}$ | Mg, Mn, Si, Y | 0.0448 | 0.765 |
| Reference Sample 35 | 16.71 | 33.42 | 0.00 | 16.63 | 0.00 | 0.00 | 33.25 | 0.00 | 0.00 | Ca$_{2.01}$Sr$_{4.02}$Ti$_2$Nb$_8$O$_{30}$ | Mg, Mn, Si, Y | 0.0448 | 0.765 |
| Reference Sample 36 | 16.75 | 33.50 | 0.00 | 16.58 | 0.00 | 0.00 | 33.17 | 0.00 | 0.00 | Ca$_{2.02}$Sr$_{4.04}$Ti$_2$Nb$_8$O$_{30}$ | Mg, Mn, Si, Y | 0.0448 | 0.765 |
| Reference Sample 37 | 16.67 | 25.00 | 8.33 | 16.67 | 0.00 | 0.00 | 33.33 | 0.00 | 0.00 | Ca$_2$Sr$_3$BaTi$_2$Nb$_8$O$_{30}$ | Mg, Mn, Si, Y | 0.0448 | 0.765 |
| Reference Sample 38 | 16.67 | 16.67 | 16.67 | 16.67 | 0.00 | 0.00 | 31.67 | 1.67 | 0.00 | Ca$_2$Sr$_2$Ba$_2$Ti$_2$Nb$_{7.6}$Ta$_{0.4}$O$_{30}$ | Mg, Mn, Si, Y | 0.0448 | 0.765 |
| Reference Sample 39 | 0.00 | 16.67 | 33.33 | 16.67 | 0.00 | 0.00 | 25.00 | 8.33 | 0.00 | Ca$_2$Ba$_4$Ti$_2$Nb$_6$Ta$_2$O$_{30}$ | Mg, Mn, Si, Y | 0.0448 | 0.765 |
| Reference Sample 40 | 7.33 | 21.33 | 21.33 | 16.67 | 0.00 | 0.00 | 25.00 | 8.33 | 0.00 | Ca$_{0.8}$Sr$_{2.6}$Ba$_{2.6}$Ti$_2$Nb$_6$Ta$_2$O$_{30}$ | Mg, Mn, Si, Y | 0.0448 | 0.765 |
| Reference Sample 41 | 16.67 | 33.33 | 0.00 | 16.67 | 0.00 | 0.00 | 33.33 | 0.00 | 0.00 | Ca$_2$Sr$_4$Ti$_2$Nb$_8$O$_{30}$ | Mg, Mn, Si, Y | 0.0010 | 0.721 |
| Reference Sample 42 | 16.67 | 33.33 | 0.00 | 16.67 | 0.00 | 0.00 | 33.33 | 0.00 | 0.00 | Ca$_2$Sr$_4$Ti$_2$Nb$_8$O$_{30}$ | Mg, Mn, Si, Y | 0.4873 | 1.213 |
| Reference Sample 43 | 16.67 | 33.33 | 0.00 | 16.67 | 0.00 | 0.00 | 33.33 | 0.00 | 0.00 | Ca$_2$Sr$_4$Ti$_2$Nb$_8$O$_{30}$ | Mg, Mn, Y | 0.0448 | 0.531 |
| Reference Sample 44 | 16.67 | 33.33 | 0.00 | 16.67 | 0.00 | 0.00 | 33.33 | 0.00 | 0.00 | Ca$_2$Sr$_4$Ti$_2$Nb$_8$O$_{30}$ | Mn, Si, Y | 0.0448 | 0.637 |
| Reference Sample 45 | 16.67 | 33.33 | 0.00 | 16.67 | 0.00 | 0.00 | 33.33 | 0.00 | 0.00 | Ca$_2$Sr$_4$Ti$_2$Nb$_8$O$_{30}$ | Mg, Mn, Si | 0.0448 | 0.407 |
| Reference Sample 46 | 33.33 | 8.33 | 8.33 | 16.67 | 0.00 | 0.00 | 33.33 | 0.00 | 0.00 | Ca$_4$SrBaTi$_2$Nb$_8$O$_{30}$ | Mg, Mn, Si, Y | 0.0448 | 0.765 |
| Reference Sample 47 | 0.00 | 42.50 | 7.50 | 16.67 | 0.00 | 0.00 | 33.33 | 0.00 | 0.00 | Sr$_{5.1}$Ba$_{0.9}$Ti$_2$Nb$_8$O$_{30}$ | Mg, Mn, Si, Y | 0.0448 | 0.765 |
| Reference Sample 48 | 5.00 | 45.00 | 0.00 | 16.67 | 0.00 | 0.00 | 33.33 | 0.00 | 0.00 | Ca$_{0.6}$Sr$_{5.4}$Ti$_2$Nb$_8$O$_{30}$ | Mg, Mn, Si, Y | 0.0448 | 0.765 |
| Reference Sample 49 | 21.67 | 0.00 | 28.33 | 16.67 | 0.00 | 0.00 | 33.33 | 0.00 | 0.00 | Ca$_{2.6}$Ba$_{3.4}$Ti$_2$Nb$_8$O$_{30}$ | Mg, Mn, Si, Y | 0.0448 | 0.765 |
| Reference Sample 50 | 27.50 | 2.50 | 20.00 | 16.67 | 0.00 | 0.00 | 33.33 | 0.00 | 0.00 | Ca$_{3.3}$Sr$_{0.3}$Ba$_{2.4}$Ti$_2$Nb$_8$O$_{30}$ | Mg, Mn, Si, Y | 0.0448 | 0.765 |
| Reference Sample 51 | 30.00 | 7.50 | 12.50 | 16.67 | 0.00 | 0.00 | 33.33 | 0.00 | 0.00 | Ca$_{3.6}$Sr$_{0.9}$Ba$_{1.5}$Ti$_2$Nb$_8$O$_{30}$ | Mg, Mn, Si, Y | 0.0448 | 0.765 |
| Reference Sample 52 | 30.00 | 12.50 | 7.50 | 16.67 | 0.00 | 0.00 | 33.33 | 0.00 | 0.00 | Ca$_{3.6}$Sr$_{1.5}$Ba$_{0.9}$Ti$_2$Nb$_8$O$_{30}$ | Mg, Mn, Si, Y | 0.0448 | 0.765 |
| Reference Sample 53 | 27.50 | 20.00 | 2.50 | 16.67 | 0.00 | 0.00 | 33.33 | 0.00 | 0.00 | Ca$_{3.3}$Sr$_{2.4}$Ba$_{0.3}$Ti$_2$Nb$_8$O$_{30}$ | Mg, Mn, Si, Y | 0.0448 | 0.765 |
| Reference Sample 54 | 25.00 | 25.00 | 0.00 | 16.67 | 0.00 | 0.00 | 33.33 | 0.00 | 0.00 | Ca$_3$Sr$_3$Ti$_2$Nb$_8$O$_{30}$ | Mg, Mn, Si, Y | 0.0448 | 0.765 |
| Reference Sample 55 | 2.50 | 45.00 | 2.50 | 16.67 | 0.00 | 0.00 | 33.33 | 0.00 | 0.00 | Ca$_{0.3}$Sr$_{5.4}$Ba$_{0.3}$Ti$_2$Nb$_8$O$_{30}$ | Mg, Mn, Si, Y | 0.0448 | 0.765 |
| Reference Sample 56 | 3.33 | 33.33 | 13.33 | 16.67 | 0.00 | 0.00 | 33.33 | 0.00 | 0.00 | Ca$_{0.4}$Sr$_4$Ba$_{1.6}$Ti$_2$Nb$_8$O$_{30}$ | Mg, Mn, Si, Y | 0.0448 | 0.765 |

TABLE 3-continued

| Sample name | First component composition in terms of oxides [mol %] | | | | | | | | | Dielectric ceramic composition | Second component composition in terms of oxides [% by mass] | | |
|---|---|---|---|---|---|---|---|---|---|---|---|---|---|
| | CaO | SrO | BaO | TiO$_2$ | ZrO$_2$ | SnO$_2$ | Nb$_2$O$_5$ | Ta$_2$O$_5$ | V$_2$O$_5$ | | Oxide component species | MnO content | Total content of second component |
| Reference Sample 57 | 10.00 | 22.50 | 17.50 | 16.67 | 0.00 | 0.00 | 33.33 | 0.00 | 0.00 | Ca$_{1.2}$Sr$_{2.7}$Ba$_{2.1}$Ti$_2$Nb$_8$O$_{30}$ | Mg, Mn, Si, Y | 0.0448 | 0.765 |
| Reference Sample 58 | 13.33 | 18.33 | 18.33 | 16.67 | 0.00 | 0.00 | 33.33 | 0.00 | 0.00 | Ca$_{1.6}$Sr$_{2.2}$Ba$_{2.2}$Ti$_2$Nb$_8$O$_{30}$ | Mg, Mn, Si, Y | 0.0448 | 0.765 |
| Reference Sample 59 | 10.00 | 17.50 | 22.50 | 16.67 | 0.00 | 0.00 | 33.33 | 0.00 | 0.00 | Ca$_{1.2}$Sr$_{2.1}$Ba$_{2.7}$Ti$_2$Nb$_8$O$_{30}$ | Mg, Mn, Si, Y | 0.0448 | 0.765 |
| Reference Sample 60 | 3.33 | 18.33 | 28.33 | 16.67 | 0.00 | 0.00 | 33.33 | 0.00 | 0.00 | Ca$_{0.4}$Sr$_{2.2}$Ba$_{3.4}$Ti$_2$Nb$_8$O$_{30}$ | Mg, Mn, Si, Y | 0.0448 | 0.765 |

TABLE 4

| Sample name | Crystal phase | Grain size [μm] | Relative dielectric constant | | Change rate of the electrostatic capacity [%] | | tan δ [%] | |
|---|---|---|---|---|---|---|---|---|
| | | | 25° C. | 200° C. | −55° C. | 200° C. | 25° C. | 200° C. |
| Reference Sample 31 | T | 2.2 | 912.8 | 1,296.2 | −43.3 | 42.0 | 3.6 | 4.8 |
| Reference Sample 32 | T | 1.8 | 551.8 | 734.6 | −5.7 | 33.1 | 2.5 | 8.0 |
| Reference Sample 33 | T | 1.7 | 564.3 | 762.3 | −6.0 | 35.1 | 2.6 | 7.4 |
| Reference Sample 34 | T | 1.8 | 532.9 | 730.5 | −6.6 | 37.1 | 2.7 | 4.6 |
| Reference Sample 35 | T | 1.9 | 614.6 | 857.8 | −5.7 | 39.6 | 2.4 | 6.0 |
| Reference Sample 36 | T | 1.8 | 596.3 | 822.6 | −6.4 | 37.9 | 2.6 | 5.3 |
| Reference Sample 37 | T | 2.5 | 430.4 | 634.8 | −14.4 | 47.5 | 1.9 | 6.8 |
| Reference Sample 38 | T | 0.9 | 637.1 | 707.6 | −23.9 | 11.1 | 2.7 | 4.0 |
| Reference Sample 39 | T | 1.1 | 123.0 | 107.9 | −15.3 | −12.3 | 1.5 | 5.8 |
| Reference Sample 40 | T | 0.9 | 129.9 | 153.3 | 8.3 | 5.8 | 1.5 | 6.0 |
| Reference Sample 41 | T | 2.3 | 702.7 | 1,140.3 | −5.7 | 42.3 | 2.3 | 8.6 |
| Reference Sample 42 | T | 2.6 | 200.4 | 206.2 | −33.1 | 48.1 | 4.7 | 9.8 |
| Reference Sample 43 | T | 2.1 | 624.4 | 922.7 | −3.9 | 47.8 | 2.1 | 6.8 |
| Reference Sample 44 | T | 2.3 | 630.8 | 1,161.1 | −2.8 | 44.1 | 1.9 | 8.8 |
| Reference Sample 45 | T | 2.0 | 776.2 | 1,350.6 | 0.3 | 34.0 | 1.5 | 3.7 |
| Reference Sample 46 | T | 1.1 | 205.4 | 210.5 | 10.2 | 9.5 | 3.6 | 7.1 |
| Reference Sample 47 | T | 0.8 | 208.3 | 205.4 | −21.9 | 10.6 | 2.6 | 8.9 |
| Reference Sample 48 | T | 2.1 | 294.8 | 397.6 | −12.3 | 26.1 | 3.8 | 9.1 |
| Reference Sample 49 | T | 1.0 | 206.7 | 244.3 | −13.4 | −12.2 | 2.3 | 3.6 |
| Reference Sample 50 | T | 1.1 | 220.2 | 258.9 | −12.9 | 13.7 | 2.1 | 3.1 |
| Reference Sample 51 | T | 1.3 | 231.4 | 270.1 | −12.5 | 13.1 | 1.9 | 2.8 |
| Reference Sample 52 | T | 1.2 | 243.6 | 281.3 | −11.4 | 12.8 | 1.7 | 2.5 |
| Reference Sample 53 | T | 0.9 | 201.3 | 206.5 | −5.9 | 8.1 | 1.6 | 3.4 |
| Reference Sample 54 | T | 1.0 | 209.6 | 201.3 | −6.6 | −8.6 | 2.8 | 5.1 |
| Reference Sample 55 | T | 1.8 | 315.3 | 418.1 | −10.5 | 20.2 | 3.2 | 8.1 |
| Reference Sample 56 | T | 1.4 | 401.4 | 435.2 | −23.4 | 13.0 | 2.3 | 6.3 |
| Reference Sample 57 | T | 1.1 | 215.3 | 204.9 | 5.9 | 3.2 | 1.1 | 3.1 |
| Reference Sample 58 | T | 1.2 | 424.5 | 410.3 | 2.8 | 1.6 | 0.6 | 1.5 |
| Reference Sample 59 | T | 1.3 | 224.7 | 212.8 | 5.4 | 2.8 | 1.2 | 3.4 |
| Reference Sample 60 | T | 1.2 | 206.1 | 213.6 | 5.8 | 3.1 | 0.9 | 1.8 |

TABLE 5

| Sample name | First component composition in terms of oxides [mol %] | | | | | | | | | Dielectric ceramic composition | Second component composition in terms of oxides [% by mass] | | |
|---|---|---|---|---|---|---|---|---|---|---|---|---|---|
| | CaO | SrO | BaO | TiO$_2$ | ZrO$_2$ | SnO$_2$ | Nb$_2$O$_5$ | Ta$_2$O$_3$ | V$_2$O$_5$ | | Oxide component species | MnO content | Total content of second component |
| Reference Sample 61 | 0.00 | 17.50 | 32.50 | 16.67 | 0.00 | 0.00 | 33.33 | 0.00 | 0.00 | Sr$_{2.1}$Ba$_{3.9}$Ti$_2$Nb$_8$O$_{30}$ | Mg, Mn, Si, Y | 0.0448 | 0.765 |
| Reference Sample 62 | 6.67 | 6.67 | 36.67 | 16.67 | 0.00 | 0.00 | 33.33 | 0.00 | 0.00 | Ca$_{0.8}$Sr$_{0.8}$Ba$_{4.4}$Ti$_2$Nb$_8$O$_{30}$ | Mg, Mn, Si, Y | 0.0448 | 0.765 |
| Reference Sample 63 | 1.67 | 5.00 | 43.33 | 16.67 | 0.00 | 0.00 | 33.33 | 0.00 | 0.00 | Ca$_{0.2}$Sr$_{0.6}$Ba$_{5.2}$Ti$_2$Nb$_8$O$_{30}$ | Mg, Mn, Si, Y | 0.0448 | 0.765 |

TABLE 5-continued

| Sample name | First component composition in terms of oxides [mol %] | | | | | | | | | Dielectric ceramic composition | Second component composition in terms of oxides [% by mass] | | |
|---|---|---|---|---|---|---|---|---|---|---|---|---|---|
| | CaO | SrO | BaO | $TiO_2$ | $ZrO_2$ | $SnO_2$ | $Nb_2O_5$ | $Ta_2O_3$ | $V_2O_5$ | | Oxide component species | MnO content | Total content of second component |
| Reference Sample 64 | 17.50 | 2.50 | 30.00 | 16.67 | 0.00 | 0.00 | 33.33 | 0.00 | 0.00 | $Ca_{2.1}Sr_{0.3}Ba_{3.6}Ti_2Nb_8O_{30}$ | Mg, Mn, Si, Y | 0.0448 | 0.765 |
| Reference Sample 65 | 50.00 | 0.00 | 0.00 | 16.67 | 0.00 | 0.00 | 33.33 | 0.00 | 0.00 | $Ca_6Ti_2Nb_8O_{30}$ | Mg, Mn, Si, Y | 0.0448 | 0.765 |
| Reference Sample 66 | 40.00 | 5.00 | 5.00 | 16.67 | 0.00 | 0.00 | 33.33 | 0.00 | 0.00 | $Ca_{4.8}Sr_{0.6}Ba_{0.6}Ti_2Nb_8O_{30}$ | Mg, Mn, Si, Y | 0.0448 | 0.765 |
| Reference Sample 67 | 0.00 | 50.00 | 0.00 | 16.67 | 0.00 | 0.00 | 33.33 | 0.00 | 0.00 | $Sr_6Ti_2Nb_8O_{30}$ | Mg, Mn, Si, Y | 0.0448 | 0.765 |
| Reference Sample 68 | 0.00 | 0.00 | 50.00 | 0.00 | 0.00 | 0.00 | 50.00 | 0.00 | 0.00 | $BaNb_2O_6$ | Mg, Mn, Si, Y | 0.0448 | 0.765 |
| Reference Sample 69 | 0.00 | 50.00 | 0.00 | 0.00 | 0.00 | 0.00 | 50.00 | 0.00 | 0.00 | $SrNb_2O_6$ | Mg, Mn, Si, Y | 0.0448 | 0.765 |
| Reference Sample 70 | 50.00 | 0.00 | 0.00 | 0.00 | 0.00 | 0.00 | 50.00 | 0.00 | 0.00 | $CaNb_2O_6$ | Mg, Mn, Si, Y | 0.0448 | 0.765 |
| Reference Sample 71 | 0.00 | 0.00 | 48.28 | 17.24 | 0.00 | 0.00 | 34.48 | 0.00 | 0.00 | $Ba_{5.6}Ti_2Nb_8O_{30}$ | Mg, Mn, Si, Y | 0.0448 | 0.765 |
| Reference Sample 72 | 0.00 | 0.00 | 51.61 | 16.13 | 0.00 | 0.00 | 32.26 | 0.00 | 0.00 | $Ba_{6.4}Ti_2Nb_8O_{30}$ | Mg, Mn, Si, Y | 0.0448 | 0.765 |
| Reference Sample 73 | 16.06 | 32.12 | 0.00 | 17.27 | 0.00 | 0.00 | 34.54 | 0.00 | 0.00 | $Ca_{1.86}Sr_{3.72}Ti_2Nb_8O_{30}$ | Mg, Mn, Si, Y | 0.0448 | 0.765 |
| Reference Sample 74 | 17.12 | 34.41 | 0.00 | 16.16 | 0.00 | 0.00 | 32.31 | 0.00 | 0.00 | $Ca_{2.12}Sr_{4.26}Ti_2Nb_8O_{30}$ | Mg, Mn, Si, Y | 0.0448 | 0.765 |
| Reference Sample 75 | 16.67 | 33.33 | 0.00 | 13.33 | 0.00 | 3.33 | 33.33 | 0.00 | 0.00 | $Ca_2Sr_4Ti_{1.6}Sn_{0.4}Nb_8O_{30}$ | Mg, Mn, Si, Y | 0.0448 | 0.765 |
| Reference Sample 76 | 16.67 | 33.33 | 0.00 | 16.67 | 0.00 | 0.00 | 30.00 | 0.00 | 3.33 | $Ca_2Sr_4Ti_2Nb_{7.2}V_{0.8}O_{30}$ | Mg, Mn, Si, Y | 0.0448 | 0.765 |
| Reference Sample 77 | 16.67 | 33.33 | 0.00 | 15.00 | 0.00 | 1.67 | 30.00 | 0.00 | 3.33 | $Ca_2Sr_4Ti_{1.8}Sn_{0.2}Nb_{7.2}V_{0.8}O_{30}$ | Mg, Mn, Si, Y | 0.0448 | 0.765 |
| Reference Sample 78 | 16.67 | 33.33 | 0.00 | 16.67 | 0.00 | 0.00 | 33.33 | 0.00 | 0.00 | $Ca_2Sr_4Ti_2Nb_8O_{30}$ | Mg, Si, Y | 0.0000 | 0.720 |
| Reference Sample 79 | 16.67 | 16.67 | 16.67 | 16.67 | 0.00 | 0.00 | 33.33 | 0.00 | 0.00 | $Ca_2Sr_2Ba_2Ti_2Nb_8O_{30}$ | Mg, Si, Y | 0.0000 | 0.720 |
| Reference Sample 80 | 16.67 | 33.33 | 0.00 | 16.67 | 0.00 | 0.00 | 33.33 | 0.00 | 0.00 | $Ca_2Sr_4Ti_2Nb_8O_{30}$ | Mg, Mn, Si, Y | 5.0710 | 5.791 |
| Reference Sample 81 | 37.50 | 12.50 | 0.00 | 16.67 | 0.00 | 0.00 | 33.33 | 0.00 | 0.00 | $Ca_{4.5}Sr_{1.5}Ti_2Nb_8O_{30}$ | Mg, Mn, Si, Y | 0.0448 | 0.765 |
| Reference Sample 82 | 37.50 | 0.00 | 12.50 | 16.67 | 0.00 | 0.00 | 33.33 | 0.00 | 0.00 | $Ca_{4.5}Ba_{1.5}Ti_2Nb_8O_{30}$ | Mg, Mn, Si, Y | 0.0448 | 0.765 |
| Reference Sample 83 | 0.00 | 47.50 | 2.50 | 16.67 | 0.00 | 0.00 | 33.33 | 0.00 | 0.00 | $Sr_{5.7}Ba_{0.3}Ti_2Nb_8O_{30}$ | Mg, Mn, Si, Y | 0.0448 | 0.765 |
| Reference Sample 84 | 36.67 | 6.67 | 6.67 | 16.67 | 0.00 | 0.00 | 33.33 | 0.00 | 0.00 | $Ca_{4.4}Sr_{0.8}Ba_{0.8}Ti_2Nb_8O_{30}$ | Mg, Mn, Si, Y | 0.0448 | 0.765 |
| Reference Sample 85 | 37.50 | 10.00 | 2.50 | 16.67 | 0.00 | 0.00 | 33.33 | 0.00 | 0.00 | $Ca_{4.5}Sr_{1.2}Ba_{0.3}Ti_2Nb_8O_{30}$ | Mg, Mn, Si, Y | 0.0448 | 0.765 |
| Reference Sample 86 | 37.50 | 2.50 | 10.00 | 16.67 | 0.00 | 0.00 | 33.33 | 0.00 | 0.00 | $Ca_{4.5}Sr_{0.3}Ba_{1.2}Ti_2Nb_8O_{30}$ | Mg, Mn, Si, Y | 0.0448 | 0.765 |
| Reference Sample 87 | 30.00 | 0.00 | 20.00 | 16.67 | 0.00 | 0.00 | 33.33 | 0.00 | 0.00 | $Ca_{3.6}Ba_{2.4}Ti_2Nb_8O_{30}$ | Mg, Mn, Si, Y | 0.0448 | 0.765 |
| Reference Sample 88 | 6.67 | 1.67 | 41.67 | 16.67 | 0.00 | 0.00 | 33.33 | 0.00 | 0.00 | $Ca_{0.8}Sr_{0.2}Ba_5Ti_2Nb_8O_{30}$ | Mg, Mn, Si, Y | 0.0448 | 0.765 |
| Reference Sample 89 | 0.00 | 32.50 | 17.50 | 16.67 | 0.00 | 0.00 | 33.33 | 0.00 | 0.00 | $Sr_{3.9}Ba_{2.1}Ti_2Nb_8O_{30}$ | Mg, Mn, Si, Y | 0.0448 | 0.765 |
| Reference Sample 90 | 0.00 | 22.50 | 27.50 | 16.67 | 0.00 | 0.00 | 33.33 | 0.00 | 0.00 | $Sr_{2.7}Ba_{3.3}Ti_2Nb_8O_{30}$ | Mg, Mn, Si, Y | 0.0448 | 0.765 |

TABLE 6

| Sample name | Crystal phase | Grain size [μm] | Relative dielectric constant | | Change rate of the electrostatic capacity [%] | | tan δ [%] | |
|---|---|---|---|---|---|---|---|---|
| | | | 25° C. | 200° C. | −55° C. | 200° C. | 25° C. | 200° C. |
| Reference Sample 61 | T | 1.7 | 231.4 | 245.3 | 7.5 | −16.4 | 1.1 | 2.1 |
| Reference Sample 62 | T | 1.8 | 238.2 | 215.4 | 12.6 | −22.3 | 2.1 | 3.6 |
| Reference Sample 63 | T | 1.4 | 459.5 | 345.2 | −19.7 | 26.5 | 1.5 | 4.4 |
| Reference Sample 64 | T | 1.5 | 311.1 | 394.4 | −22.7 | 27.4 | 3.7 | 5.9 |
| Reference Sample 65 | T | 0.5 | 44.0 | 61.7 | −18.9 | 40.3 | 5.1 | 10.9 |
| Reference Sample 66 | T | 0.6 | 135.1 | 244.5 | −12.9 | 81.0 | 2.2 | 27.2 |

TABLE 6-continued

| Sample name | Crystal phase | Grain size [μm] | Relative dielectric constant | | Change rate of the electrostatic capacity [%] | | tan δ [%] | |
|---|---|---|---|---|---|---|---|---|
| | | | 25° C. | 200° C. | −55° C. | 200° C. | 25° C. | 200° C. |
| Reference Sample 67 | T | 0.7 | 86.8 | 84.4 | −12.9 | −2.8 | 2.8 | 14.6 |
| Reference Sample 68 | T | 1.8 | 51.7 | 482.7 | 1.2 | 833.3 | 5.6 | 56.1 |
| Reference Sample 69 | T | 1.6 | 101.6 | 54.3 | −52.2 | −46.5 | 39.4 | 0.1 |
| Reference Sample 70 | T | 0.9 | 57.1 | 43.0 | −24.6 | −24.7 | 26.7 | 0.1 |
| Reference Sample 71 | T | 1.3 | 611.6 | 994.7 | −6.6 | 62.6 | 2.1 | 18.8 |
| Reference Sample 72 | T | 1.2 | 715.3 | 997.4 | −7.0 | 39.4 | 2.3 | 14.6 |
| Reference Sample 73 | T | 2.3 | 717.7 | 957.7 | −6.2 | 33.4 | 2.5 | 11.7 |
| Reference Sample 74 | T | 3.1 | 525.0 | 757.2 | −4.1 | 44.2 | 2.8 | 16.8 |
| Reference Sample 75 | T | 2.5 | 986.8 | 4,909.9 | −23.7 | 397.5 | 3.7 | 84.3 |
| Reference Sample 76 | T | 2.4 | 2,555.1 | N.D. | N.D. | N.D. | 64.0 | N.D. |
| Reference Sample 77 | T | 4.1 | 1,269.0 | 2,886.4 | −50.7 | 127.5 | 28.7 | 90.9 |
| Reference Sample 78 | T | 2.2 | 713.2 | 1,158.0 | −5.4 | 62.4 | 2.8 | 18.9 |
| Reference Sample 79 | T | 1.9 | 310.4 | 335.2 | −10.5 | 59.6 | 6.5 | 15.8 |
| Reference Sample 80 | T | 2.8 | 257.2 | 281.5 | −15.7 | 62.3 | 9.8 | 12.1 |
| Reference Sample 81 | T | 0.7 | 125.2 | 183.4 | −10.3 | 61.1 | 2.9 | 17.0 |
| Reference Sample 82 | T | 2.0 | 80.3 | 83.4 | −19.1 | 30.2 | 4.6 | 10.1 |
| Reference Sample 83 | T | 0.8 | 94.8 | 92.4 | −25.8 | −4.9 | 5.6 | 21.5 |
| Reference Sample 84 | T | 0.7 | 102.5 | 133.6 | −7.5 | 60.5 | 3.3 | 13.4 |
| Reference Sample 85 | T | 0.8 | 113.8 | 158.5 | −8.6 | 60.8 | 3.1 | 15.2 |
| Reference Sample 86 | T | 1.4 | 90.4 | 108.5 | −13.6 | 50.6 | 3.9 | 11.8 |
| Reference Sample 87 | T | 1.6 | 102.9 | 106.1 | −22.9 | 6.1 | 4.1 | 7.7 |
| Reference Sample 88 | T | 1.1 | 180.1 | 189.8 | −14.5 | 20.1 | 5.0 | 9.1 |
| Reference Sample 89 | T | 1.5 | 188.9 | 175.3 | 6.6 | 3.8 | 4.9 | 7.8 |
| Reference Sample 90 | T | 1.2 | 171.4 | 162.6 | −4.5 | −6.9 | 5.1 | 8.0 |

(3) Evaluation

From the above-described results, the samples existing within the range surrounded by the line segments of A-B-C-D-E in FIG. 1 had relative dielectric constants at 25° C. of 100.0 or more. In other words, it was confirmed that these samples had ferroelectricity. The samples existing within the range surrounded by the line segments of A-B-C-D-E in FIG. 1 also had change rate of the electrostatic capacities of within ±50.0% in the temperature range of −55° C. to 200° C. and dielectric losses (tan δ) at 25° C. and 200° C. of 10.0% or less.

Furthermore, the samples existing within the range surrounded by the line segments of point A'-point B'-point C'-point D'-point E'-point F'-point G'-point H'-point I'-point J'-point K-point L' in FIG. 2 had relative dielectric constants at 25° C. of 200.0 or more.

Of these samples, the samples of Reference Sample Numbers 5, 8, 12, 15, 17, 18, 23 to 25, 27, 29 to 36, 38, 41, and 43 to 45 indicated relative dielectric constants of 500.0 or more and thus are particularly preferable.

The samples of Reference Sample Numbers 1 to 4, 7 to 13, 16 to 18, 23 to 28, 38 to 40, 46, 47, 49 to 62, and 87 to 90 indicated change rate of the electrostatic capacities $\Delta C_t/C_{25}$ in the temperature region of −55° C. to 200° C. of −33.0% to +22.0% and thus are particularly excellent in temperature properties.

In contrast to these samples, the samples of Reference Sample Numbers 65 to 86 did not provide excellent properties about one or more performances of the relative dielectric constant, the change rate of the electrostatic capacity, and tan δ.

As illustrated in FIG. 6, it is found that the change rate of the electrostatic capacity is within the range of −30.0% to 30.0% in the temperature range of −55° C. to 200° C. in the case where Reference Samples 8 and 15 are used, whereas the change rate of the electrostatic capacity is remarkably increased over around 150° C. in the case of Reference Sample 66.

Reference Sample 15 and Reference Sample 78 are samples that only has difference in the presence or absence of the oxide of Mn as the second component. As illustrated in FIG. 7, it is found that properties of both samples are significantly different.

Reference Example 2

The Reference Samples 91 to 107 were prepared in the same method as the method in Reference Sample 1 except that the raw materials for the first component described above were weighed so that the compositions in terms of the oxides were as listed in Table 7 and MnCO₃ and Sift were weighed as the second component so that the compositions in terms of the oxides were as listed in Table 7. The disk-shaped ceramic capacitors corresponding to each of the samples were provided.

Thereafter, similar to Reference Example 1, the grain size, the crystal phase, the relative dielectric constant, the change rate of the electrostatic capacity, and the dielectric loss (tan δ) were measured. The results are listed in Table 8.

From these results, it is found that the samples having the Mn content in terms of MnO serving as the second component of less than 3.500% by mass relative to the total mass of the first component in terms of the oxides provide excellent results with respect to the relative dielectric constant, the change rate of the electrostatic capacity, and tan δ.

TABLE 7

| Sample name | First component composition in terms of oxides [mol %] | | | | | | | | |
|---|---|---|---|---|---|---|---|---|---|
| | CaO | SrO | BaO | $TiO_2$ | $ZrO_2$ | $SnO_2$ | $Nb_2O_5$ | $Ta_2O_3$ | $V_2O_5$ |
| Reference Sample 91 | 12.50 | 33.30 | 4.16 | 15.03 | 1.67 | 0.00 | 29.97 | 3.33 | 0.00 |
| Reference Sample 92 | 12.50 | 33.30 | 4.16 | 15.03 | 1.67 | 0.00 | 29.97 | 3.33 | 0.00 |
| Reference Sample 93 | 12.50 | 33.30 | 4.16 | 15.03 | 1.67 | 0.00 | 29.97 | 3.33 | 0.00 |
| Reference Sample 94 | 12.50 | 33.30 | 4.16 | 15.03 | 1.67 | 0.00 | 29.97 | 3.33 | 0.00 |
| Reference Sample 95 | 12.50 | 33.30 | 4.16 | 15.03 | 1.67 | 0.00 | 29.97 | 3.33 | 0.00 |
| Reference Sample 96 | 12.50 | 33.30 | 4.16 | 15.03 | 1.67 | 0.00 | 29.97 | 3.33 | 0.00 |
| Reference Sample 97 | 12.50 | 33.30 | 4.16 | 15.03 | 1.67 | 0.00 | 29.97 | 3.33 | 0.00 |
| Reference Sample 98 | 12.50 | 33.30 | 4.16 | 15.03 | 1.67 | 0.00 | 29.97 | 3.33 | 0.00 |
| Reference Sample 99 | 12.50 | 33.30 | 4.16 | 15.03 | 1.67 | 0.00 | 29.97 | 3.33 | 0.00 |
| Reference Sample 100 | 12.50 | 33.30 | 4.16 | 15.03 | 1.67 | 0.00 | 29.97 | 3.33 | 0.00 |
| Reference Sample 101 | 12.50 | 33.30 | 4.16 | 15.03 | 1.67 | 0.00 | 29.97 | 3.33 | 0.00 |
| Reference Sample 102 | 12.50 | 33.30 | 4.16 | 15.03 | 1.67 | 0.00 | 29.97 | 3.33 | 0.00 |
| Reference Sample 103 | 12.50 | 33.30 | 4.16 | 15.03 | 1.67 | 0.00 | 29.97 | 3.33 | 0.00 |
| Reference Sample 104 | 12.50 | 33.30 | 4.16 | 15.03 | 1.67 | 0.00 | 29.97 | 3.33 | 0.00 |
| Reference Sample 105 | 12.50 | 33.30 | 4.16 | 15.03 | 1.67 | 0.00 | 29.97 | 3.33 | 0.00 |
| Reference Sample 106 | 12.50 | 33.30 | 4.16 | 15.03 | 1.67 | 0.00 | 29.97 | 3.33 | 0.00 |
| Reference Sample 107 | 12.50 | 33.30 | 4.16 | 15.03 | 1.67 | 0.00 | 29.97 | 3.33 | 0.00 |

| | Dielectric ceramic composition | Second component composition in terms of oxides [% by mass] | | |
|---|---|---|---|---|
| | | Oxide component species | MnO content | Total content of second component |
| Reference Sample 91 | $Ca_{1.5}Sr_4Ba_{0.5}Ti_{1.8}Zr_{0.2}Nb_{7.2}Ta_{0.8}O_{30}$ | Mn, Si | 0.6172 | 0.917 |
| Reference Sample 92 | $Ca_{1.5}Sr_4Ba_{0.5}Ti_{1.8}Zr_{0.2}Nb_{7.2}Ta_{0.8}O_{30}$ | Mn, Si | 0.9258 | 1.226 |
| Reference Sample 93 | $Ca_{1.5}Sr_4Ba_{0.5}Ti_{1.8}Zr_{0.2}Nb_{7.2}Ta_{0.8}O_{30}$ | Mn, Si | 1.2344 | 1.534 |
| Reference Sample 94 | $Ca_{1.5}Sr_4Ba_{0.5}Ti_{1.8}Zr_{0.2}Nb_{7.2}Ta_{0.8}O_{30}$ | Mn, Si | 3.0860 | 3.386 |
| Reference Sample 95 | $Ca_{1.5}Sr_4Ba_{0.5}Ti_{1.8}Zr_{0.2}Nb_{7.2}Ta_{0.8}O_{30}$ | Mn, Si | 3.3946 | 3.695 |
| Reference Sample 96 | $Ca_{1.5}Sr_4Ba_{0.5}Ti_{1.8}Zr_{0.2}Nb_{7.2}Ta_{0.8}O_{30}$ | Mn, Si | 3.6414 | 3.941 |
| Reference Sample 97 | $Ca_{1.5}Sr_4Ba_{0.5}Ti_{1.8}Zr_{0.2}Nb_{7.2}Ta_{0.8}O_{30}$ | Mn, Si | 0.9258 | 1.426 |
| Reference Sample 98 | $Ca_{1.5}Sr_4Ba_{0.5}Ti_{1.8}Zr_{0.2}Nb_{7.2}Ta_{0.8}O_{30}$ | Mn, Si | 1.2344 | 1.734 |
| Reference Sample 99 | $Ca_{1.5}Sr_4Ba_{0.5}Ti_{1.8}Zr_{0.2}Nb_{7.2}Ta_{0.8}O_{30}$ | Mn, Si | 3.0860 | 3.586 |
| Reference Sample 100 | $Ca_{1.5}Sr_4Ba_{0.5}Ti_{1.8}Zr_{0.2}Nb_{7.2}Ta_{0.8}O_{30}$ | Mn, Si | 3.3946 | 3.895 |
| Reference Sample 101 | $Ca_{1.5}Sr_4Ba_{0.5}Ti_{1.8}Zr_{0.2}Nb_{7.2}Ta_{0.8}O_{30}$ | Mn, Si | 3.6414 | 4.141 |
| Reference Sample 102 | $Ca_{1.5}Sr_4Ba_{0.5}Ti_{1.8}Zr_{0.2}Nb_{7.2}Ta_{0.8}O_{30}$ | Mn, Si | 0.6172 | 1.317 |
| Reference Sample 103 | $Ca_{1.5}Sr_4Ba_{0.5}Ti_{1.8}Zr_{0.2}Nb_{7.2}Ta_{0.8}O_{30}$ | Mn, Si | 0.9258 | 1.626 |
| Reference Sample 104 | $Ca_{1.5}Sr_4Ba_{0.5}Ti_{1.8}Zr_{0.2}Nb_{7.2}Ta_{0.8}O_{30}$ | Mn, Si | 1.2344 | 1.934 |
| Reference Sample 105 | $Ca_{1.5}Sr_4Ba_{0.5}Ti_{1.8}Zr_{0.2}Nb_{7.2}Ta_{0.8}O_{30}$ | Mn, Si | 3.0860 | 3.786 |

TABLE 7-continued

| | | | | |
|---|---|---|---|---|
| Reference Sample 106 | $Ca_{1.5}Sr_4Ba_{0.5}Ti_{1.8}Zr_{0.2}Nb_{7.2}Ta_{0.8}O_{30}$ | Mn, Si | 3.3946 | 4.095 |
| Reference Sample 107 | $Ca_{1.5}Sr_4Ba_{0.5}Ti_{1.8}Zr_{0.2}Nb_{7.2}Ta_{0.8}O_{30}$ | Mn, Si | 3.6414 | 4.341 |

In Table 7, the composition in terms of the oxide of the first component is represented by mol % of each of the oxides in terms of the oxides listed in Table 7 relative to the total number of moles of each of the oxide components of the first component in terms of the oxides listed in Table 7. The content of the Mn oxide is represented by % by mass of the Mn oxide in terms of MnO relative to the total mass of each of the oxide components of the first component in terms of the oxides listed in Table 7. The total content of the oxides of the second component is represented by % by mass of the total of the oxides of the second component relative to the total mass of each of the oxide components of the first component in terms of the oxide listed in Table 7.

Subsequently, each of the blends was dried at 100° C. and thereafter calcinated at 750° C. to 900° C. for 3 hours in the air. The obtained product was similarly finely pulverized again with the ball mill to prepare the dielectric raw material for the first component.

As the second component, a mixture made by weighing and mixing 41.2 mg of $MnCO_3$, 72.2 mg of MgO, and 53.9 mg of $SiO_2$ was provided and this mixture was used as the raw material for second component. Here, the raw material for second component was used in an amount of 1.3 times in each of Samples 1 to 3, 5, 10, 12 to 19, 26 to 31, and 32 to 52. In Samples 2 to 19, 33, 34, 36, 37, 39, 40, 42, 43, 45, 46, 48, 49, 51, and 52, in addition to the above-described raw

TABLE 8

| Sample name | Crystal phase | Grain size [μm] | Relative dielectric constant | | Change rate of the electrostatic capacity [%] | | tan δ [%] | |
|---|---|---|---|---|---|---|---|---|
| | | | 25° C. | 200° C. | −55° C. | 200° C. | 25° C. | 200° C. |
| Reference Sample 91 | T | 1.5 | 965.7 | 932.3 | −17.0 | −3.5 | 1.5 | 1.6 |
| Reference Sample 92 | T | 1.8 | 953.9 | 921.4 | −18.7 | −3.4 | 1.3 | 5.2 |
| Reference Sample 93 | T | 1.5 | 886.3 | 687.2 | −18.7 | −22.5 | 4.0 | 1.6 |
| Reference Sample 94 | T | 1.6 | 869.5 | 750.6 | −17.6 | −13.7 | 1.8 | 5.6 |
| Reference Sample 95 | T | 1.8 | 842.6 | 631.8 | −16.2 | −20.3 | 2.2 | 8.3 |
| Reference Sample 96 | T | 2.0 | 767.1 | 582.4 | −12.3 | −27.9 | 2.8 | 12.4 |
| Reference Sample 97 | T | 2.5 | 981.3 | 935.7 | −19.1 | −4.6 | 1.5 | 2.4 |
| Reference Sample 98 | T | 2.2 | 1,011.8 | 985.1 | −20.6 | −2.6 | 2.0 | 2.1 |
| Reference Sample 99 | T | 1.6 | 805.1 | 713.3 | −17.5 | −11.4 | 1.2 | 6.3 |
| Reference Sample 100 | T | 1.5 | 738.6 | 573.3 | −16.3 | −18.2 | 2.3 | 9.5 |
| Reference Sample 101 | T | 1.3 | 627.8 | 446.6 | −15.8 | −30.7 | 2.7 | 15.8 |
| Reference Sample 102 | T | 1.3 | 988.6 | 952.3 | −20.7 | −3.7 | 2.3 | 1.2 |
| Reference Sample 103 | T | 3.5 | 973.5 | 924.6 | −20.8 | −5.0 | 2.1 | 2.3 |
| Reference Sample 104 | T | 4.4 | 972.1 | 921.3 | −21.2 | −5.2 | 1.8 | 1.9 |
| Reference Sample 105 | T | 4.5 | 804.0 | 717.7 | −18.8 | −10.7 | 2.1 | 7.1 |
| Reference Sample 106 | T | 4.8 | 725.2 | 586.3 | −17.2 | −16.9 | 2.6 | 9.8 |
| Reference Sample 107 | T | 5.1 | 584.7 | 488.1 | −14.4 | −29.3 | 2.9 | 17.2 |

From the above-described results, from comparison with the samples in which the content of the first component is out of the defined amount of the present invention or the samples in which the content of the oxide of Mn is out of the defined amount of the present invention, the samples in which the content of the first component is in the defined amount of the present invention, the content of the oxide of Mn is in the defined amount of the present invention, and the oxide of Cu and the oxide of Ru are not included exhibit effects of a small change in the electrostatic capacity even under a high temperature condition of 150° C. to 200° C., the change rate of the electrostatic capacity within the range of −50.0% to 50.0% in a temperature range of −55° C. to 200° C., and small dielectric losses at 25° C. and 200° C.

Example 1 and Comparative Example 1

(1) Preparation of Dielectric Ceramic Composition Samples 1 to 64

As the starting materials of the first component, each powder of $CaCO_3$, $SrCO_3$, $BaCO_3$, $TiO_2$, $ZrO_2$, $SnO_2$, $Nb_2O_5$, $Ta_2O_5$, and $V_2O_5$ was weighed so that the ratio of each powder in terms of the oxides was as listed in Table 9 and Table 11 and the resultant mixture was wet-blended for 20 hours with pure water using a ball mill.

materials, as the raw material for the second component, CuO was provided in 0.036% by mass to 27.000% by mass relative to the total mass of each of the oxides of the first component in terms of the oxides listed in the tables. In Samples 20 to 31, 34, 37, 40, 43, 46, 49, and 52, in addition to the above-described raw materials, as the raw material for the second component, $RuO_2$ was provided in 0.100% by mass to 60.000% by mass relative to the total mass of each of the oxides of the first component in terms of the oxide listed in the tables.

A poly(vinyl alcohol) aqueous solution was prepared by charging ion-exchanged water and poly(vinyl alcohol) in a container so that the polyvinyl alcohol concentration was 6% by mass and mixing the resultant mixture at 90° C. for 1 hour.

Then, 25 g of each of the dielectric raw materials for the first component and the raw material for the second component having the above-described amount were mixed. The poly(vinyl alcohol) aqueous solution was added to the raw material mixture so that the concentration of the poly(vinyl alcohol) aqueous solution was 10% by mass relative to the resultant mixture and the resultant product was mixed and granulated in a mortar to prepare a granulated powder.

Furthermore, the obtained granulated powder was charged in a mold having a diameter of 14.0 mm and press-molded at a pressure of 1 ton/cm² to provide a disk-shaped green compact.

Subsequently, the obtained green compact was fired in a reducing atmosphere to prepare a sintered compact. In this firing, the temperature increasing rate, the holding temperature, and the holding time were set to 300° C./h, 1,100° C. to 1,300° C., and two hours, respectively. As an atmosphere gas, moistened hydrogen/nitrogen mixture gas (hydrogen concentration 0.5%) was used and a wetter (wetter temperature 35° C.) was used for the moistening.

<Insulation Resistance Value>

For each of the capacitor samples, the insulation resistance value was measured using a digital ultra-high resistance meter/microammeter (8340A, manufactured by ADC CORPORATION) at an applied voltage of 200 V. The insulation resistance value was determined to be excellent when the insulation resistance value is 100 MΩ or more at 200° C.

TABLE 9

| Sample name | First component composition in terms of oxides [mol %] | | | | | | | Dielectric ceramic composition |
|---|---|---|---|---|---|---|---|---|
| | CaO | SrO | BaO | TiO$_2$ | ZrO$_2$ | Nb$_2$O$_5$ | Ta$_2$O$_5$ | |
| Sample 1 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 2 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 3 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 4 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 5 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 6 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 7 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 8 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 9 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 10 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 11 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 12 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 13 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 14 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 15 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 16 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 17 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 18 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 19 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 20 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 21 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 22 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 23 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 24 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 25 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 26 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 27 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 28 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 29 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 30 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 31 | 12.50 | 33.33 | 4.17 | 15.00 | 1.67 | 30.00 | 3.33 | Ca$_{1.5}$Sr$_4$Ba$_{0.5}$Ti$_{1.8}$Zr$_{0.2}$Nb$_{7.2}$Ta$_{0.8}$O$_{30}$ |
| Sample 32 | 25.00 | 25.00 | 0.00 | 15.00 | 1.67 | 28.75 | 4.58 | Ca$_3$Sr$_3$Ti$_{1.8}$Zr$_{0.2}$Nb$_{6.9}$Ta$_{1.1}$O$_{30}$ |

| | Second component composition in terms of oxides [% by mass] | | | |
|---|---|---|---|---|
| | Oxide component species | MnO content | CuO content | RuO$_2$ content | Total content of second component |
| Sample 1 | Mg, Mn, Si | 0.132 | 0.000 | 0.000 | 0.991 |
| Sample 2 | Mg, Mn, Si, Cu | 0.132 | 0.036 | 0.000 | 1.027 |
| Sample 3 | Mg, Mn, Si, Cu | 0.132 | 0.045 | 0.000 | 1.036 |
| Sample 4 | Mg, Mn, Si, Cu | 0.102 | 0.050 | 0.000 | 0.812 |
| Sample 5 | Mg, Mn, Si, Cu | 0.132 | 0.054 | 0.000 | 1.045 |
| Sample 6 | Mg, Mn, Si, Cu | 0.102 | 0.100 | 0.000 | 0.862 |
| Sample 7 | Mg, Mn, Si, Cu | 0.102 | 0.200 | 0.000 | 0.962 |
| Sample 8 | Mg, Mn, Si, Cu | 0.102 | 0.500 | 0.000 | 1.262 |
| Sample 9 | Mg, Mn, Si, Cu | 0.102 | 0.750 | 0.000 | 1.512 |
| Sample 10 | Mg, Mn, Si, Cu | 0.132 | 0.900 | 0.000 | 1.891 |
| Sample 11 | Mg, Mn, Si, Cu | 0.102 | 1.000 | 0.000 | 1.762 |
| Sample 12 | Mg, Mn, Si, Cu | 0.132 | 1.125 | 0.000 | 2.116 |
| Sample 13 | Mg, Mn, Si, Cu | 0.132 | 1.350 | 0.000 | 2.341 |
| Sample 14 | Mg, Mn, Si, Cu | 0.132 | 1.575 | 0.000 | 2.566 |
| Sample 15 | Mg, Mn, Si, Cu | 0.132 | 1.800 | 0.000 | 2.791 |
| Sample 16 | Mg, Mn, Si, Cu | 0.132 | 2.700 | 0.000 | 3.691 |
| Sample 17 | Mg, Mn, Si, Cu | 0.132 | 4.500 | 0.000 | 5.491 |
| Sample 18 | Mg, Mn, Si, Cu | 0.132 | 18.000 | 0.000 | 18.991 |
| Sample 19 | Mg, Mn, Si, Cu | 0.132 | 27.000 | 0.000 | 27.991 |
| Sample 20 | Mg, Mn, Si, Ru | 0.102 | 0.000 | 0.100 | 0.862 |
| Sample 21 | Mg, Mn, Si, Ru | 0.102 | 0.000 | 0.200 | 0.962 |
| Sample 22 | Mg, Mn, Si, Ru | 0.102 | 0.000 | 0.500 | 1.262 |

TABLE 9-continued

| | | | | | |
|---|---|---|---|---|---|
| Sample 23 | Mg, Mn, Si, Ru | 0.102 | 0.000 | 1.000 | 1.762 |
| Sample 24 | Mg, Mn, Si, Ru | 0.102 | 0.000 | 5.000 | 5.762 |
| Sample 25 | Mg, Mn, Si, Ru | 0.102 | 0.000 | 10.000 | 10.762 |
| Sample 26 | Mg, Mn, Si, Ru | 0.132 | 0.000 | 15.000 | 15.991 |
| Sample 27 | Mg, Mn, Si, Ru | 0.132 | 0.000 | 20.000 | 20.991 |
| Sample 28 | Mg, Mn, Si, Ru | 0.132 | 0.000 | 30.000 | 30.991 |
| Sample 29 | Mg, Mn, Si, Ru | 0.132 | 0.000 | 40.000 | 40.991 |
| Sample 30 | Mg, Mn, Si, Ru | 0.132 | 0.000 | 50.000 | 50.991 |
| Sample 31 | Mg, Mn, Si, Ru | 0.132 | 0.000 | 60.000 | 60.991 |
| Sample 32 | Mg, Mn, Si | 0.132 | 0.000 | 0.000 | 0.991 |

In Table 9 and Table 11, the composition in terms of the oxide of the first component is represented by mol % of each of the oxides in terms of the oxides listed in the tables relative to the total number of moles of each of the oxide components of the first component in terms of the oxides listed in the tables. The content of the Mn oxide is represented by % by mass of the Mn oxide in terms of MnO relative to the total mass of each of the oxide components of the first component in terms of the oxides listed in the tables. The content of the Cu oxide is represented by % by mass of the Cu oxide in terms of CuO relative to the total mass of each of the oxide components of the first component in terms of the oxides listed in the tables. The content of the Ru oxide is represented by % by mass of the Ru oxide in terms of $RuO_2$ relative to the total mass of each of the oxide components of the first component in terms of the oxides listed in the tables. The total content of the oxides of the second component is represented by % by mass of the total of the oxides of the second component relative to the total mass of each of the oxide components of the first component in terms of the oxide listed in the tables.

TABLE 10

| Sample name | Relative dielectric constant | | Change rate of the electrostatic capacity [%] | | tan δ [%] | | Insulation resistance value [MΩ] |
|---|---|---|---|---|---|---|---|
| | 25° C. | 200° C. | −55° C. | 200° C. | 25° C. | 200° C. | 200° C. |
| Sample 1 | 865.5 | 923.9 | −18.3 | 6.8 | 1.9 | 6.2 | 26 |
| Sample 2 | 824.9 | 840.2 | −16.3 | 1.9 | 1.1 | 3.6 | 64 |
| Sample 3 | 798.7 | 818.2 | −18.3 | 2.4 | 1.7 | 4.8 | 60 |
| Sample 4 | 805.8 | 789.7 | −17.9 | −2.0 | 1.6 | 3.0 | 80 |
| Sample 5 | 774.9 | 809.5 | −17.9 | 4.5 | 1.6 | 6.1 | 40 |
| Sample 6 | 855.8 | 817.0 | −14.8 | −4.5 | 1.2 | 2.6 | 1,694 |
| Sample 7 | 759.9 | 754.1 | −18.9 | −0.8 | 1.7 | 2.8 | 926 |
| Sample 8 | 759.0 | 750.8 | −21.2 | −1.1 | 1.7 | 2.4 | 988 |
| Sample 9 | 790.3 | 766.8 | −16.8 | −3.0 | 1.7 | 2.2 | 1,420 |
| Sample 10 | 816.6 | 815.6 | −15.0 | −0.1 | 1.7 | 3.5 | 1,260 |
| Sample 11 | 799.0 | 773.3 | −16.9 | −3.2 | 1.5 | 2.3 | 1,279 |
| Sample 12 | 791.1 | 795.1 | −17.9 | 0.5 | 1.8 | 3.1 | 1,926 |
| Sample 13 | 823.0 | 819.4 | −19.5 | −0.4 | 1.6 | 3.2 | 1,890 |
| Sample 14 | 830.4 | 821.4 | −16.0 | −1.1 | 2.1 | 3.3 | 2,187 |
| Sample 15 | 807.9 | 803.5 | −8.0 | −0.5 | 2.0 | 3.5 | 1,939 |
| Sample 16 | 863.1 | 852.9 | −15.2 | −1.2 | 1.3 | 3.1 | 1,837 |
| Sample 17 | 917.5 | 913.3 | −15.0 | −0.4 | 1.6 | 3.4 | 1,538 |
| Sample 18 | 1,159.3 | 1,667.6 | −41.8 | 43.8 | 3.2 | 9.8 | 197 |
| Sample 19 | 955.7 | 2,562.6 | −33.7 | 168.1 | 12.6 | 61.4 | 0.251 |
| Sample 20 | 663.0 | 677.7 | −17.9 | 2.2 | 1.4 | 5.7 | 47 |
| Sample 21 | 676.1 | 626.6 | −19.1 | −7.3 | 1.6 | 2.9 | 93 |
| Sample 22 | 718.9 | 712.1 | −20.0 | −0.9 | 1.6 | 4.5 | 208 |
| Sample 23 | 817.6 | 784.0 | −18.3 | −4.1 | 1.6 | 3.5 | 105 |
| Sample 24 | 758.4 | 716.4 | −19.6 | −5.5 | 1.7 | 3.8 | 136 |
| Sample 25 | 769.1 | 732.4 | −18.2 | −4.8 | 1.6 | 2.4 | 137 |
| Sample 26 | 830.3 | 820.2 | −16.7 | −1.2 | 2.4 | 3.6 | 219 |
| Sample 27 | 1,022.1 | 971.5 | −16.3 | −4.9 | 4.4 | 6.9 | 1,270 |
| Sample 28 | 1,398.1 | 1,250.6 | −24.7 | −10.5 | 4.0 | 9.2 | 600 |
| Sample 29 | 1,108.5 | 1,152.8 | −13.6 | 4.0 | 3.3 | 4.1 | 1,300 |
| Sample 30 | 1,848.8 | 1,826.5 | −17.2 | −1.2 | 37.1 | 69.7 | 0.087 |
| Sample 31 | 8,587.1 | 5,692.1 | −40.7 | −33.7 | N.D. | N.D. | N.D. |
| Sample 32 | 662.0 | 660.7 | −22.7 | −0.2 | 2.7 | 4.9 | 8.30 |

TABLE 11

| Sample name | First component composition in terms of oxides [mol %] | | | | | | | Dielectric ceramic composition |
|---|---|---|---|---|---|---|---|---|
| | CaO | SrO | BaO | $TiO_2$ | $ZrO_2$ | $Nb_2O_5$ | $Ta_2O_5$ | |
| Sample 33 | 25.00 | 25.00 | 0.00 | 15.00 | 1.67 | 28.75 | 4.58 | $Ca_3Sr_3Ti_{1.8}Zr_{0.2}Nb_{6.9}Ta_{1.1}O_{30}$ |
| Sample 34 | 25.00 | 25.00 | 0.00 | 15.00 | 1.67 | 28.75 | 4.58 | $Ca_3Sr_3Ti_{1.8}Zr_{0.2}Nb_{6.9}Ta_{1.1}O_{30}$ |

TABLE 11-continued

| | | | | | | | | |
|---|---|---|---|---|---|---|---|---|
| Sample 35 | 25.00 | 0.00 | 25.00 | 15.00 | 1.67 | 28.75 | 4.58 | $Ca_3Ba_3Ti_{1.8}Zr_{0.2}Nb_{6.9}Ta_{1.1}O_{30}$ |
| Sample 36 | 25.00 | 0.00 | 25.00 | 15.00 | 1.67 | 28.75 | 4.58 | $Ca_3Ba_3Ti_{1.8}Zr_{0.2}Nb_{6.9}Ta_{1.1}O_{30}$ |
| Sample 37 | 25.00 | 0.00 | 25.00 | 15.00 | 1.67 | 28.75 | 4.58 | $Ca_3Ba_3Ti_{1.8}Zr_{0.2}Nb_{6.9}Ta_{1.1}O_{30}$ |
| Sample 38 | 0.00 | 5.00 | 45.00 | 15.00 | 1.67 | 28.75 | 4.58 | $Sr_{0.6}Ba_{5.4}Ti_{1.8}Zr_{0.2}Nb_{6.9}Ta_{1.1}O_{30}$ |
| Sample 39 | 0.00 | 5.00 | 45.00 | 15.00 | 1.67 | 28.75 | 4.58 | $Sr_{0.6}Ba_{5.4}Ti_{1.8}Zr_{0.2}Nb_{6.9}Ta_{1.1}O_{30}$ |
| Sample 40 | 0.00 | 5.00 | 45.00 | 15.00 | 1.67 | 28.75 | 4.58 | $Sr_{0.6}Ba_{5.4}Ti_{1.8}Zr_{0.2}Nb_{6.9}Ta_{1.1}O_{30}$ |
| Sample 41 | 8.33 | 16.67 | 25.00 | 15.00 | 1.67 | 28.75 | 4.58 | $CaSr_2Ba_3Ti_{1.8}Zr_{0.2}Nb_{6.2}Ta_{1.1}O_{30}$ |
| Sample 42 | 8.33 | 16.67 | 25.00 | 15.00 | 1.67 | 28.75 | 4.58 | $CaSr_2Ba_3Ti_{1.8}Zr_{0.2}Nb_{6.9}Ta_{1.1}O_{30}$ |
| Sample 43 | 8.33 | 16.67 | 25.00 | 15.00 | 1.67 | 28.75 | 4.58 | $CaSr_2Ba_3Ti_{1.8}Zr_{0.2}Nb_{6.9}Ta_{1.1}O_{30}$ |
| Sample 44 | 30.00 | 10.00 | 10.00 | 15.00 | 1.67 | 28.75 | 4.58 | $Ca_{3.6}Sr_{1.2}Ba_{1.2}Ti_{1.8}Zr_{0.2}Nb_{6.9}Ta_{1.1}O_{30}$ |
| Sample 45 | 30.00 | 10.00 | 10.00 | 15.00 | 1.67 | 28.75 | 4.58 | $Ca_{3.6}Sr_{1.2}Ba_{1.2}Ti_{1.8}Zr_{0.2}Nb_{6.9}Ta_{1.1}O_{30}$ |
| Sample 46 | 30.00 | 10.00 | 10.00 | 15.00 | 1.67 | 28.75 | 4.58 | $Ca_{3.6}Sr_{1.2}Ba_{1.2}Ti_{1.8}Zr_{0.2}Nb_{6.9}Ta_{1.1}O_{30}$ |
| Sample 47 | 16.67 | 33.33 | 0.00 | 15.00 | 1.67 | 28.75 | 4.58 | $Ca_2Sr_4Ti_{1.8}Zr_{0.2}Nb_{6.9}Ta_{1.1}O_{30}$ |
| Sample 48 | 16.67 | 33.33 | 0.00 | 15.00 | 1.67 | 28.75 | 4.58 | $Ca_2Sr_4Ti_{1.8}Zr_{0.2}Nb_{6.9}Ta_{1.1}O_{30}$ |
| Sample 49 | 16.67 | 33.33 | 0.00 | 15.00 | 1.67 | 28.75 | 4.58 | $Ca_2Sr_4Ti_{1.8}Zr_{0.2}Nb_{6.9}Ta_{1.1}O_{30}$ |
| Sample 50 | 0.00 | 42.50 | 7.50 | 15.00 | 1.67 | 28.75 | 4.58 | $Sr_{5.1}Ba_{0.9}Ti_{1.8}Zr_{0.2}Nb_{6.9}Ta_{1.1}O_{30}$ |
| Sample 51 | 0.00 | 42.50 | 7.50 | 15.00 | 1.67 | 28.75 | 4.58 | $Sr_{5.1}Ba_{0.9}Ti_{1.8}Zr_{0.2}Nb_{6.9}Ta_{1.1}O_{30}$ |
| Sample 52 | 0.00 | 42.50 | 7.50 | 15.00 | 1.67 | 28.75 | 4.58 | $Sr_{5.1}Ba_{0.9}Ti_{1.8}Zr_{0.2}Nb_{6.9}Ta_{1.1}O_{30}$ |
| Sample 53 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 54 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 55 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 56 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 57 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 58 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 59 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 60 | 14.58 | 33.33 | 2.08 | 15.00 | 1.67 | 28.75 | 4.58 | $Ca_{1.75}Sr_4Ba_{0.25}Ti_{1.8}Zr_{0.2}Nb_{6.9}Ta_{1.1}O_{30}$ |
| Sample 61 | 14.58 | 33.33 | 2.08 | 15.00 | 1.67 | 28.75 | 4.58 | $Ca_{1.75}Sr_4Ba_{0.25}Ti_{1.8}Zr_{0.2}Nb_{6.9}Ta_{1.1}O_{30}$ |
| Sample 62 | 14.58 | 33.33 | 2.08 | 15.00 | 1.67 | 28.75 | 4.58 | $Ca_{1.75}Sr_4Ba_{0.25}Ti_{1.8}Zr_{0.2}Nb_{6.9}Ta_{1.1}O_{30}$ |
| Sample 63 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |
| Sample 64 | 12.50 | 33.33 | 4.17 | 15.00 | 1.67 | 30.00 | 3.33 | $Ca_{1.5}Sr_4Ba_{0.5}Ti_{1.8}Zr_{0.2}Nb_{7.2}Ta_{0.8}O_{30}$ |

| | Second component composition in terms of oxides [% by mass] | | | |
|---|---|---|---|---|
| | Oxide component species | MnO content | CuO content | $RuO_2$ content | Total content of second component |
| Sample 33 | Mg, Mn, Si, Cu | 0.132 | 0.677 | 0.000 | 1.667 |
| Sample 34 | Mg, Mn, Si, Cu, Ru | 0.132 | 0.677 | 1.000 | 2.667 |
| Sample 35 | Mg, Mn, Si | 0.132 | 0.000 | 0.000 | 0.991 |
| Sample 36 | Mg, Mn, Si, Cu | 0.132 | 0.677 | 0.000 | 1.667 |
| Sample 37 | Mg, Mn, Si, Cu, Ru | 0.132 | 0.677 | 1.000 | 2.667 |
| Sample 38 | Mg, Mn, Si | 0.132 | 0.000 | 0.000 | 0.991 |
| Sample 39 | Mg, Mn, Si, Cu | 0.132 | 0.677 | 0.000 | 1.667 |
| Sample 40 | Mg, Mn, Si, Cu, Ru | 0.132 | 0.677 | 1.000 | 2.667 |
| Sample 41 | Mg, Mn, Si | 0.132 | 0.000 | 0.000 | 0.991 |
| Sample 42 | Mg, Mn, Si, Cu | 0.132 | 0.677 | 0.000 | 1.667 |
| Sample 43 | Mg, Mn, Si, Cu, Ru | 0.132 | 0.677 | 1.000 | 2.667 |
| Sample 44 | Mg, Mn, Si | 0.132 | 0.000 | 0.000 | 0.991 |
| Sample 45 | Mg, Mn, Si, Cu | 0.132 | 0.677 | 0.000 | 1.667 |
| Sample 46 | Mg, Mn, Si, Cu, Ru | 0.132 | 0.677 | 1.000 | 2.667 |
| Sample 47 | Mg, Mn, Si | 0.132 | 0.000 | 0.000 | 0.991 |
| Sample 48 | Mg, Mn, Si, Cu | 0.132 | 0.677 | 0.000 | 1.667 |
| Sample 49 | Mg, Mn, Si, Cu, Ru | 0.132 | 0.677 | 1.000 | 2.667 |
| Sample 50 | Mg, Mn, Si | 0.132 | 0.000 | 0.000 | 0.991 |
| Sample 51 | Mg, Mn, Si, Cu | 0.132 | 0.677 | 0.000 | 1.667 |
| Sample 52 | Mg, Mn, Si, Cu, Ru | 0.132 | 0.677 | 1.000 | 2.667 |
| Sample 53 | Mn, Cu | 0.309 | 0.100 | 0.000 | 0.409 |
| Sample 54 | Mn, Cu | 0.309 | 0.200 | 0.000 | 0.509 |
| Sample 55 | Mn, Cu | 0.309 | 0.750 | 0.000 | 1.059 |
| Sample 56 | Mn, Cu | 0.309 | 1.000 | 0.000 | 1.309 |
| Sample 57 | Mn, Ru | 0.309 | 0.000 | 0.500 | 0.809 |
| Sample 58 | Mn, Ru | 0.309 | 0.000 | 1.000 | 1.309 |
| Sample 59 | Mn, Cu, Ru | 0.309 | 0.750 | 0.750 | 1.809 |
| Sample 60 | Mn, Si, Cu | 0.247 | 0.750 | 0.000 | 1.159 |
| Sample 61 | Mn, Si, Ru | 0.247 | 0.000 | 1.000 | 1.409 |
| Sample 62 | Mn, Si, Cu, Ru | 0.247 | 0.750 | 0.750 | 1.909 |
| Sample 63 | Mn, Si, Cu | 0.309 | 0.680 | 0.000 | 1.192 |
| Sample 64 | Mg, Mn, Si | 0.102 | 0.000 | 0.000 | 0.762 |

TABLE 12

| Sample name | Relative dielectric constant | | Change rate of the electrostatic capacity [%] | | tan δ [%] | | Insulation resistance value [MΩ] |
|---|---|---|---|---|---|---|---|
| | 25° C. | 200° C. | −55° C. | 200° C. | 25° C. | 200° C. | 200° C. |
| Sample 33 | 622.0 | 460.5 | −27.2 | −26.0 | 2.9 | 6.3 | 211 |
| Sample 34 | 558.9 | 418.6 | −21.3 | −25.1 | 2.0 | 6.2 | 429 |
| Sample 35 | 796.3 | 665.3 | −27.5 | −16.5 | 2.1 | 8.0 | 2.72 |
| Sample 36 | 858.9 | 600.3 | −26.0 | −30.1 | 2.9 | 6.4 | 103 |
| Sample 37 | 817.2 | 660.7 | −26.0 | −19.1 | 2.7 | 5.8 | 100 |
| Sample 38 | 586.3 | 413.3 | 20.7 | −29.5 | 0.8 | 2.4 | 35.7 |
| Sample 39 | 644.1 | 485.7 | 20.7 | −24.6 | 0.7 | 7.0 | 309 |
| Sample 40 | 676.2 | 446.4 | 29.5 | −34.0 | 1.1 | 3.4 | 561 |
| Sample 41 | 1,061.9 | 601.9 | −9.4 | −43.3 | 0.9 | 4.2 | 14.7 |
| Sample 42 | 1,115.0 | 634.1 | −11.3 | −43.1 | 1.3 | 4.8 | 277 |
| Sample 43 | 1,008.5 | 614.2 | −7.4 | −39.1 | 0.9 | 6.6 | 427 |
| Sample 44 | 511.0 | 453.3 | −24.8 | −11.3 | 2.2 | 5.0 | 8.62 |
| Sample 45 | 606.8 | 460.3 | −23.0 | −24.1 | 3.2 | 3.6 | 189 |
| Sample 46 | 566.3 | 359.9 | −26.4 | −36.5 | 1.9 | 1.4 | 274 |
| Sample 47 | 1,003.5 | 823.8 | −26.0 | −17.9 | 3.7 | 3.1 | 17.6 |
| Sample 48 | 1,234.7 | 737.9 | −33.8 | −40.2 | 1.2 | 4.7 | 893 |
| Sample 49 | 1,160.4 | 809.6 | −28.9 | −30.2 | 3.8 | 2.9 | 1,959 |
| Sample 50 | 1,234.2 | 680.1 | 2.0 | −44.9 | 1.1 | 6.2 | 9.5 |
| Sample 51 | 1,178.6 | 648.1 | 4.9 | −45.0 | 1.3 | 3.6 | 371 |
| Sample 52 | 1,252.9 | 697.8 | 5.6 | −44.3 | 1.0 | 3.0 | 698 |
| Sample 53 | 995.4 | 869.9 | −15.4 | 8.1 | 1.0 | 0.3 | 1,230 |
| Sample 54 | 892.8 | 802.9 | −18.2 | 1.6 | 1.3 | 0.4 | 1,780 |
| Sample 55 | 928.5 | 816.4 | −17.4 | 6.6 | 1.3 | 0.2 | 2,430 |
| Sample 56 | 938.7 | 823.3 | −17.5 | 6.4 | 1.2 | 0.2 | 2,700 |
| Sample 57 | 844.6 | 758.1 | −19.9 | 2.1 | 1.3 | 0.5 | 802 |
| Sample 58 | 960.6 | 834.7 | −18.2 | 7.1 | 1.3 | 0.4 | 913 |
| Sample 59 | 1,068.8 | 931.7 | −18.5 | −6.3 | 1.0 | 0.2 | 2,610 |
| Sample 60 | 719.2 | 655.9 | −12.6 | −8.8 | 0.9 | 0.7 | 2,990 |
| Sample 61 | 728.5 | 667.7 | −18.5 | −8.4 | 1.0 | 0.8 | 1,863 |
| Sample 62 | 666.6 | 603.1 | −18.8 | −9.5 | 1.0 | 0.8 | 3,890 |
| Sample 63 | 811.2 | 756.4 | −15.1 | −6.8 | 1.5 | 0.5 | 1,697 |
| Sample 64 | 901.3 | 856.9 | −29.2 | −4.9 | 1.8 | 7.0 | 18 |

From the above-described results, it is confirmed that the content of the first component is in the defined amount of the present invention, that the oxide of Mn is included in the defined amount of the present invention, and that one or both of the oxide of Cu and the oxide of Ru are included in the defined amount of the present invention, whereby a high relative dielectric constant at 25° C., a small change in the electrostatic capacity even under a high temperature condition of 150° C. to 200° C., the change rate of the electrostatic capacity within the range of −50.0% to 50.0% in a temperature range of −55° C. to 200° C., small dielectric loss at 25° C. and 200° C., and the high insulation resistance value at 200° C. can be achieved.

From the comparison with the Reference Samples in which the content of the first component is in the range of the defined amount of the present invention and the content of the oxide of Mn is in the defined amount of the present invention, but the oxide of Cu and the oxide of Ru are not included, it is found that the content of the first component is in the range of the defined amount of the present invention, that the oxide of Mn is included in the range of the defined amount of the present invention, and that one or both of the oxide of Cu and the oxide of Ru are included in the range of the defined amount of the present invention, whereby the insulation resistance value can be increased without significantly affecting the effect on the relative dielectric constant, the change rate of the electrostatic capacity, and the dielectric loss.

In the above-described example, the single-plate type ceramic capacitors have been evaluated. For a laminated ceramic capacitor in which dielectric layers and internal electrodes are laminated, similar results can also be obtained.

SIGNS

1 Laminated Ceramic Capacitor
2 Dielectric Layer
3 Internal Electrode Layer
4 External Electrode
10 Laminated body

The invention claimed is:

1. A dielectric ceramic composition comprising:
   a first component; and
   a second component, wherein
   as a content ratio relative to a total number of moles of the first component when converted into following oxides, the first component comprises an oxide of Ca of 0.00 mol % to 35.85 mol % in terms of CaO, an oxide of Sr of 0.00 mol % to 47.12 mol % in terms of SrO, an oxide of Ba of 0.00 mol % to 51.22 mol % in terms of BaO, an oxide of Ti of 0.00 mol % to 17.36 mol % in terms of $TiO_2$, an oxide of Zr of 0.00 mol % to 17.36 mol % in terms of $ZrO_2$, an oxide of Sn of 0.00 mol % to 2.60 mol % in terms of $SnO_2$, an oxide of Nb of 0.00 mol % to 35.32 mol % in terms of $Nb_2O_5$, an oxide of Ta of 0.00 mol % to 35.32 mol % in terms of $Ta_2O_5$, and an oxide of V of 0.00 mol % to 2.65 mol % in terms of $V_2O_5$;
   the first component comprises at least one oxide selected from the oxide of Ca, the oxide of Sr, and the oxide of Ba, at least one oxide selected from the oxide of Ti and the oxide of Zr, and at least one oxide selected from the oxide of Nb and the oxide of Ta as essential components, and a total content ratio of the oxide of Ca in terms of CaO, the oxide of Sr in terms of SrO, and the oxide of Ba in terms of BaO is 48.72 mol % to 51.22 mol %, a total content ratio of the oxide of Ti in terms of $TiO_2$, the oxide of Zr in terms of $ZrO_2$, and the oxide of Sn in terms of $SnO_2$ is 15.97 mol % to 17.36 mol %, and a total content ratio of the oxide of Nb in terms of $Nb_2O_5$, the oxide of Ta in terms of $Ta_2O_5$, and the oxide of V in terms of $V_2O_5$ is 31.42 mol % to 35.31 mol % relative to the total number of moles of the first component when converted into the oxides; and as a content ratio relative to a total mass of the first component when converted into the oxides, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

2. A dielectric ceramic composition comprising:
a first component; and
a second component, wherein
as the first component, a compound represented by a following general formula (1):

$$A_a M^1_b M^2_c O_d \quad (1)$$

(in the formula (1), A is represented by a general formula (2):

$$Ba_{1-x-y}Sr_xCa_y \quad (2)$$

(in the formula (2), $0 \le x \le 0.920$ and $0 \le y \le 0.700$); $M^1$ is at least one element selected from Ti, Zr, and Sn; $M^2$ is at least one element selected from Nb, Ta, and V; and $5.70 \le a \le 6.30$, $1.90 \le b \le 2.10$, $7.20 \le c \le 8.80$, and $27.45 \le d \le 32.50$) is included, wherein when Sn is included, a content ratio of the oxide of Sn in terms of $SnO_2$ relative to a total number of moles of the oxide of Ti in terms of $TiO_2$, the oxide of Zr in terms of $ZrO_2$, and the oxide of Sn in terms of $SnO_2$ is 15.00 mol % or less and when V is included, a content ratio of the oxide of V in terms of $V_2O_5$ relative to a total number of moles of the oxide of Nb in terms of $Nb_2O_5$, the oxide of Ta in terms of $Ta_2O_5$, and the oxide of V in terms of $V_2O_5$ is 7.50 mol % or less; and as a content ratio relative to a total mass of the first component when the first component is converted into CaO, SrO, BaO, $TiO_2$, $ZrO_2$, $SnO_2$, $Nb_2O_5$, $Ta_2O_5$, and $V_2O_5$, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

3. A dielectric ceramic composition comprising:
a first component; and
a second component, wherein
a compound represented by a following general formula (3):

$$\alpha \cdot Ca_{\eta 1}M^3_{\theta 1}M^4_{\phi 1}O_{\omega 1} \text{-} \beta \cdot Sr_{\eta 2}M^3_{\theta 2}M^4_{\phi 2}O_{\omega 2}\text{-}\gamma \cdot Ba_{\eta 3}M^3_{\theta 3}M^4_{\phi 3}O_{\omega 3} \quad (3)$$

(in the formula (3), $\eta 1$, $\eta 2$, and $\eta 3$ each independently are values within a range of 5.70 to 6.30; $\theta 1$, $\theta 2$, and $\theta 3$ each independently are values within a range of 0.95 to 1.05; $\phi 1$, $\phi 2$, and $\phi 3$ each independently are values within a range of 0.90 to 1.10; $\omega 1$, $\omega 2$, and $\omega 3$ each independently are values within a range of 27.45 to 32.50; $M^3$ is represented by a general formula (4):

$$Ti_{2-\rho-\sigma}Zr_\rho Sn_\sigma \quad (4)$$

(in the formula (4), $0 \le \rho \le 2.0$ and $0 \le \sigma \le 0.3$); $M^4$ is represented by a general formula (5):

$$Nb_{8-\pi-\psi}Ta_\pi V_\psi \quad (5)$$

(in the formula (5), $0 \le \pi \le 8.0$ and $0 \le \psi \le 0.6$); and $\alpha$, $\beta$, and $\gamma$ satisfy $\alpha+\beta+\gamma=1.00$), and when an arbitrary point in a ternary composition diagram is represented as $(\alpha, \beta, \gamma)$, the compound existing within a range surrounded by line segments linking a point A=(0.05, 0.95, 0.00), a point B=(0.70, 0.30, 0.00), a point C=(0.70, 0.00, 0.30), a point D=(0.00, 0.00, 1.00), and a point E=(0.00, 0.90, 0.10) is included as the first component; and as a content ratio relative to a total mass of the first component when the first component is converted into CaO, SrO, BaO, $TiO_2$, $ZrO_2$, $SnO_2$, $Nb_2O_5$, $Ta_2O_5$, and $V_2O_5$, the second component comprises at least (a) an oxide of Mn of 0.005% by mass to 3.500% by mass in terms of MnO and (b) one or both of an oxide of Cu of 0.080% by mass to 20.000% by mass in terms of CuO and an oxide of Ru of 0.300% by mass to 45.000% by mass in terms of $RuO_2$.

4. The dielectric ceramic composition according to claim 3, wherein the first component is a compound existing within a range surrounded by line segments linking a point A'=(0.05, 0.95, 0.00), a point B'=(0.60, 0.40, 0.00), a point C'=(0.70, 0.20, 0.10), a point D'=(0.70, 0.10, 0.20), a point E'=(0.55, 0.00, 0.45), a point F'=(0.40, 0.00, 0.60), a point G'=(0.10, 0.10, 0.80), a point H'=(0.00, 0.00, 1.00), a point I'=(0.00, 0.40, 0.60) a point J'=(0.20, 0.40, 0.40), a point K'=(0.00, 0.70, 0.30), and a point L'=(0.00, 0.90, 0.10) in the ternary composition diagram.

5. The dielectric ceramic composition according to claim 1, wherein an oxide of D (D is at least one element selected from Li, Mg, Si, Cr, Al, Fe, Co, Ni, Zn, Ga, Ge, In, W, Mo, Y, Hf, La, Ce, Pr, Nd, Sm, Eu, Gd, Tb, Dy, Ho, Er, Tm, Yb, and Lu) is included as the second component.

6. The dielectric ceramic composition according to claim 1, wherein the dielectric ceramic composition comprises a tungsten bronze type crystal phase.

7. The dielectric ceramic composition according to claim 1, wherein relative dielectric constant at 25° C. is 100.0 or more.

8. The dielectric ceramic composition according to claim 7, wherein the relative dielectric constant at 25° C. is 200.0 or more.

9. The dielectric ceramic composition according to claim 8, wherein the relative dielectric constant at 25° C. is 300.0 or more.

10. The dielectric ceramic composition according to claim 1, wherein a change rate of the electrostatic capacity is within a range of −50.0% to 50.0% in a temperature range of −55° C. to 200° C.

11. The dielectric ceramic composition according to claim 1, wherein a change rate of the electrostatic capacity is within a range of −33.0% to 22.0% in a temperature range of −55° C. to 200° C.

12. The dielectric ceramic composition according to claim 1, wherein a dielectric loss (tan δ) at 25° C. is 10.0% or less and a dielectric loss (tan δ) at 200° C. is 10.0% or less.

13. The dielectric ceramic composition according to claim 1, wherein an insulation resistance value at 200° C. is 100 MΩ or more.

14. A ceramic electronic component comprising:
a dielectric layer formed of the dielectric ceramic composition as claimed in claim 1; and
an electrode layer comprising a base metal as a conductive component.

15. The ceramic electronic component according to claim 14, wherein the base metal is at least one metal selected from nickel and copper.

16. The ceramic electronic component according to claim 14, wherein a plurality of the dielectric layers and a plurality of the electrode layers are laminated.

\* \* \* \* \*